(12) United States Patent
Sugiyama et al.

(10) Patent No.: US 6,380,472 B1
(45) Date of Patent: Apr. 30, 2002

(54) ELECTRIC TUTOR FOR DIRECTLY INDICATING MANIPULATORS TO BE ACTUATED, MUSICAL INSTRUMENT WITH BUILT-IN ELECTRIC TUTOR, METHOD FOR GUIDING FINGERING AND INFORMATION STORAGE MEDIUM FOR STORING PROGRAM REPRESENTATIVE OF THE METHOD

(75) Inventors: Nobuo Sugiyama; Haruki Uehara; Kiyoshi Kawamura, all of Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/471,665

(22) Filed: Dec. 24, 1999

(30) Foreign Application Priority Data

Dec. 25, 1998 (JP) .............................. 10-371398

(51) Int. Cl.[7] .............................................. G09B 15/08
(52) U.S. Cl. ........................ 84/478; 84/600; 84/470 R; 84/477 R; 84/485 R; 84/719
(58) Field of Search ............................ 84/600–602, 615, 84/618, 653, 656, 470 R, 477 R, 478, 479 A, 485 R, 719–721, 17–20, 462

(56) References Cited

U.S. PATENT DOCUMENTS

| 5,652,403 A | | 7/1997 | Sugiyama et al. |
|---|---|---|---|
| 5,824,930 A | | 10/1998 | Ura et al. |
| 6,084,167 A | * | 7/2000 | Akimoto et al. ........... 84/477 R |
| 6,194,643 B1 | * | 2/2001 | Meisel ........................... 84/18 |
| 6,194,649 B1 | * | 2/2001 | Itou et al. ...................... 84/719 |
| 6,229,081 B1 | * | 5/2001 | Ura et al. ...................... 84/462 |

FOREIGN PATENT DOCUMENTS

| JP | 8-292765 | 11/1996 |
|---|---|---|
| JP | 9-54584 | 2/1997 |

* cited by examiner

Primary Examiner—Marlon T. Fletcher
(74) Attorney, Agent, or Firm—Morrison & Foerster

(57) ABSTRACT

A keyboard musical instrument that is equipped with an electric tutor for guiding a trainee in practicing manipulation of black and white piano keys, whereby the electric tutor reads pieces of musical data information representative of the black and white keys to be depressed and a timing to depress each of the black or white keys for guiding the trainee in the fingering. More specifically, while the trainee is practicing a piece of music, the electric tutor automatically sinks the designated black or white keys as an advanced notice to the trainee so that the trainee can prepare to depress the keys at the appropriate timing, and whereby the electric tutor sinks the same keys again for an inductive action at the time when such keys are to be appropriately depressed.

19 Claims, 15 Drawing Sheets

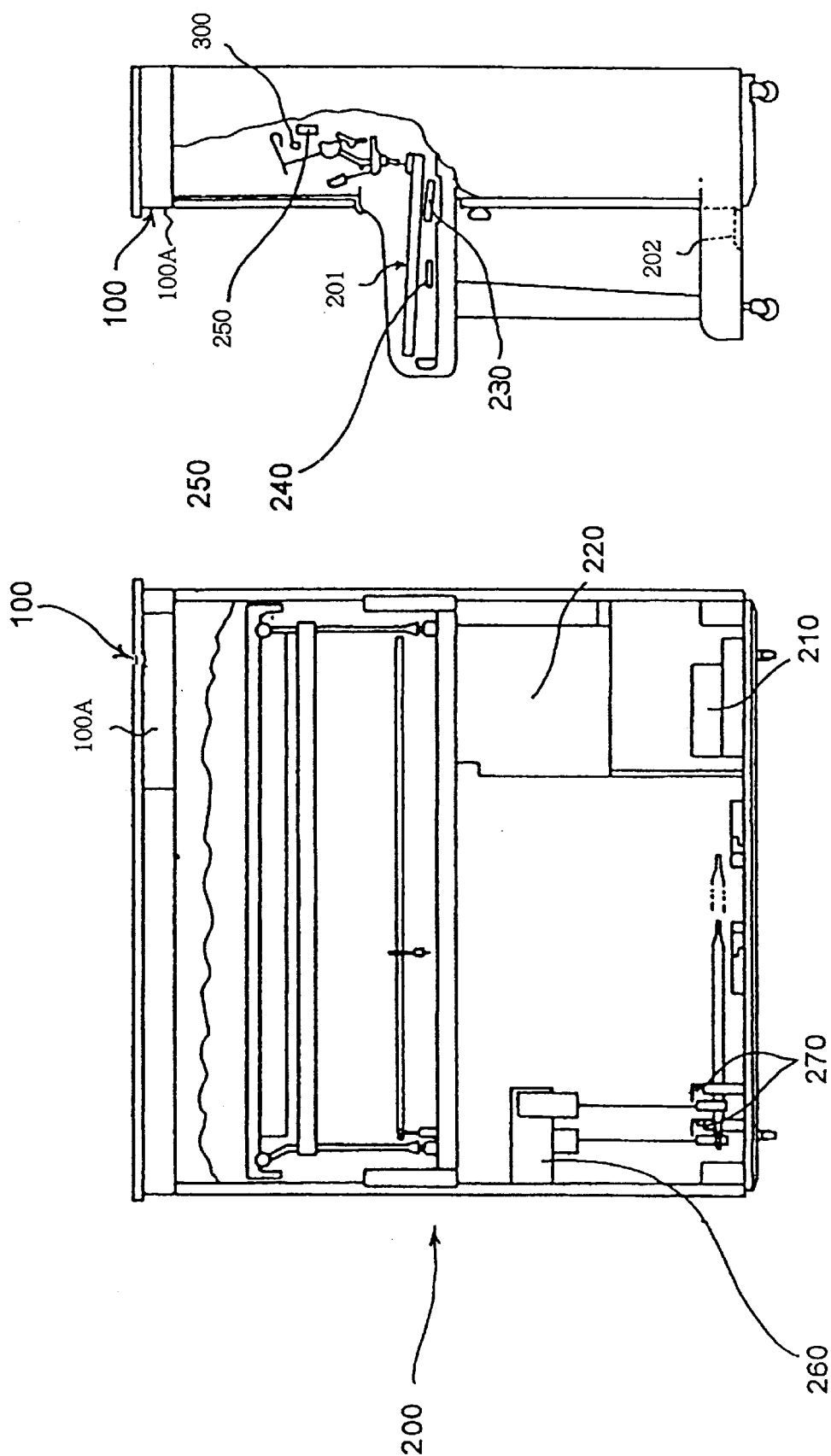

| ADDRESS | DATA | DURATION TIME | EVENT DATA | NOTE NUMBER | VELOCITY |
|---|---|---|---|---|---|
| 1 | DURATION | 100 | — | — | — |
| 2 | EVENT | — | NOTE-ON | 62 | 150 |
| 3 | DURATION | 200 | — | — | — |
| 4 | EVENT | — | NOTE-OFF | 62 | — |
| 5 | DURATION | 300 | — | — | — |
| 6 | EVENT | — | NOTE-ON | 67 | 200 |
| 7 | DURATION | 250 | — | — | — |
| 8 | EVENT | — | NOTE-OFF | 67 | — |
| n | END | — | — | — | — |

Fig. 8

ELECTRIC TUTOR FOR DIRECTLY INDICATING MANIPULATORS TO BE ACTUATED, MUSICAL INSTRUMENT WITH BUILT-IN ELECTRIC TUTOR, METHOD FOR GUIDING FINGERING AND INFORMATION STORAGE MEDIUM FOR STORING PROGRAM REPRESENTATIVE OF THE METHOD

FIELD OF THE INVENTION

This invention relates to a musical education instrument and, more particularly, to an electric tutor, a musical instrument with built-in electric tutor, a method for guiding the fingering on a musical instrument and an information storage medium for storing a computer program representative of the method.

DESCRIPTION OF THE RELATED ART

It is said that beginners hardly make progress in musical instruments by themselves. The beginner must learn how to read a musical score and practice the fingering in accordance with a series of notes on the musical score. In order to assist the beginner in the practice, electric tutors have been developed for a musical instrument such as, for example, a keyboard musical instrument. A typical example of the electric tutor for a keyboard musical instrument has optical indicators such as an array of light emitting diodes located in proximity to the black/white keys, respectively, and sequentially illuminates the optical indicators. The trainee fingers on the keyboard under the guidance of the electric tutor. Thus, the electric tutor offers the guidance by optically indicating the black/white keys to be depressed.

Following problems are encountered in the prior art electric tutors. Although the optical indicators are provided in proximity to the black/white keys, the trainee needs to repeatedly search the array of optical indicators to see what key is to be depressed during the practice. The trainee concentrates the attention to the array of optical indicators. This means that the trainee tends to divert the attention from the fingers on the keyboard. The practice without the attention to the fingers on the keyboard is not desirable. Thus, the prior art electric tutors are less desirable.

When the trainee finds the light radiated from an optical indicator during the search, he or she starts to depress the black/white key indicated by the optical indicator. A time lug is unavoidably introduced between the notice of the optical indication and the fingering. Thus, the prior art electric tutor teaches the trainee what keys are to be depressed, but can not exactly teach the timing to depress the keys.

SUMMARY OF THE INVENTION

It is therefore an important object of the present invention to provide an electric tutor, which directly indicates manipulators to be activated.

It is also an important object of the present invention to provide a musical instrument, a built-in electric tutor of which directly indicates manipulators to be activated.

It is another important object of the present invention to provide a method used in the electric tutor.

It is yet another important object of the present invention to provide an information storage medium, which stores a program representative of the method.

To accomplish the object, the present invention proposes to give a previous notice and an inductive action to a black/white key to be depressed.

In accordance with one aspect of the present invention, there is provided an electric tutor associated with a musical instrument having plural manipulators for guiding a trainee in a practice on the plural manipulators, and the electric tutor comprises a memory for storing pieces of music data information representative of a performance, a data processor selectively fetching the pieces of music data information and generating a piece of control data information representative of one of the plural manipulators to be manipulated in the practice and another piece of control data information representative of a timing to manipulate the aforesaid one of the plural manipulators and a driver including plural driving units respectively associated with the plural manipulators and responsive to the piece of control data information and the aforesaid another piece of control data information so as to manipulate the aforesaid one of the plural manipulators at the timing to the extent not to generate a sound.

In accordance with another aspect of the present invention, there is provided a musical instrument comprising plural manipulators used for specifying an attribute of tones, a tone generating means responsive to the plural manipulators for generating the tones and an electric tutor including a memory for storing pieces of music data information representative of a performance, a data processor selectively fetching the pieces of music data information and generating a piece of control data information representative of one of the plural manipulators to be manipulated in the practice and another piece of control data information representative of a timing to manipulate the one of aforesaid plural manipulators and a driver including plural driving units respectively associated with the plural manipulators and responsive to the piece of control data information and the aforesaid another piece of control data information so as to manipulate the aforesaid one of the plural manipulators at the timing to the extent not to generate the tone.

In accordance with yet another aspect of the present invention, there is provided a method for guiding a trainee in a practice on plural manipulator incorporated in a musical instrument comprising the steps of a) determining one of the plural manipulators to be manipulated and a timing to manipulate the aforesaid one of the plural manipulators, b) waiting for the timing and c) manipulating the aforesaid one of the plural manipulators at the timing to the extent not to generate a tone.

In accordance with still another aspect of the present invention, there is provided an information storage medium for storing a program representative of a method for guiding a trainee in a practice on plural manipulator incorporated in a musical instrument, and the method comprises the steps of a) determining one of the plural manipulators to be manipulated and a timing to manipulate the aforesaid one of the plural manipulators, b) waiting for the timing and c) manipulating the aforesaid one of the plural manipulators at the timing to the extent not to generate a tone.

BRIEF DESCRIPTION OF THE DRAWINGS

The features and advantages of the electric tutor, the method and the information storage medium will be more clearly understood from the following description taken in conjunction with the accompanying drawings in which:

FIG. 1 is a partially cut-away front view showing the structure of an electronic piano equipped with an electric tutor according to the present invention;

FIG. 2 is a partially cut-away side view showing the electronic piano;

FIG. 8 is a view showing MIDI data codes stored in a random access memory device in a control unit;

DESCRIPTION OF THE PREFERRED EMBODIMENTS

First Embodiment

Figure 3:
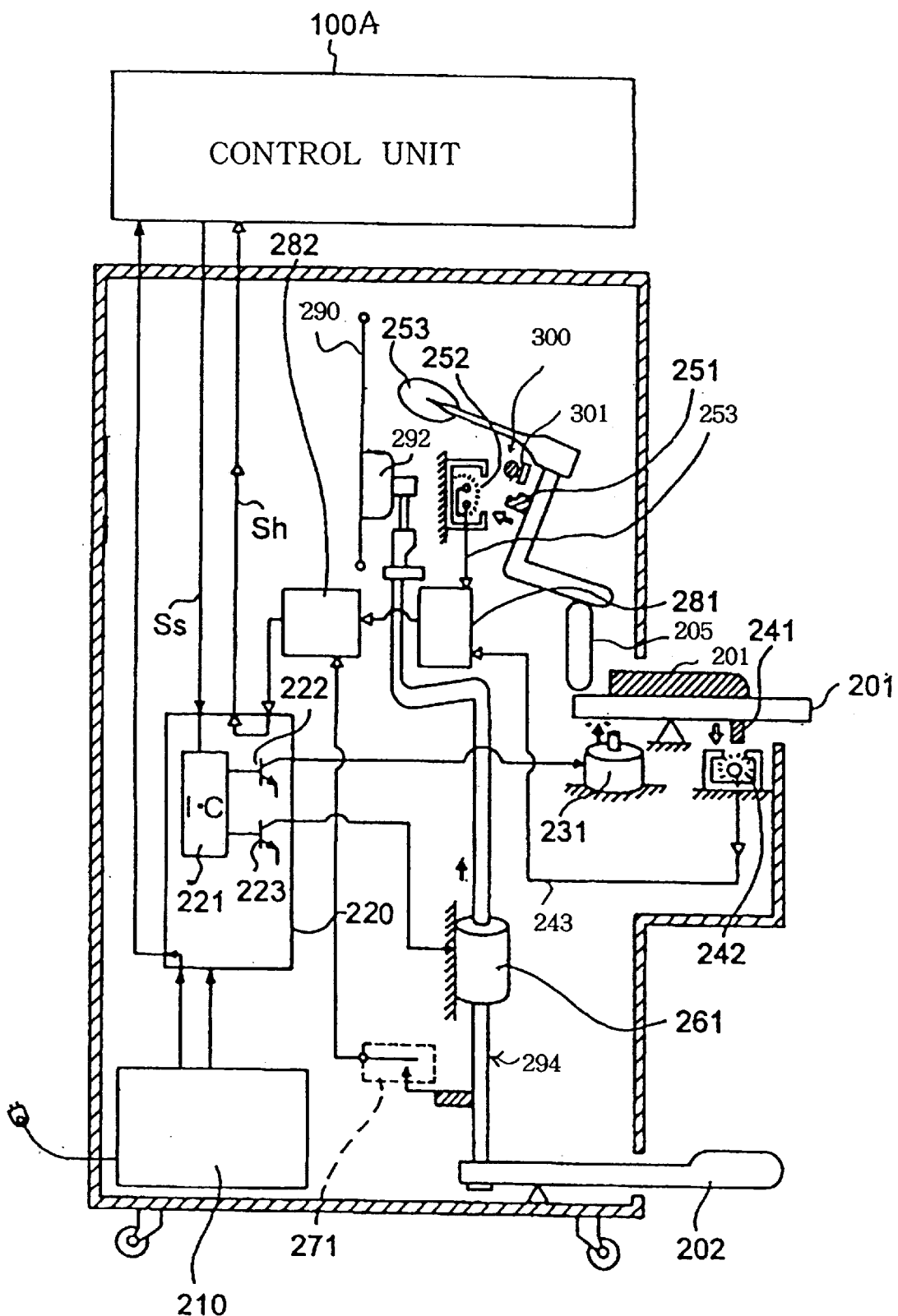
FIG. 3 is a schematic view showing the arrangement of mechanical/electric components of the electronic piano.

An electric tutor implementing the first embodiment assists a trainee in a practice of the fingering on a keyboard and steps on a damper pedal both incorporated in an acoustic upright piano. The electric tutor slightly sinks the keys to be depressed in order to guide the trainee in the fingering. The key motion is a previous notice, and teaches the trainee a key to be depressed and the timing to depress the key. The damper pedal is also moved for the previous notice and the timing.

Referring to FIGS. 1 and 2 of the drawings, an electronic piano comprises an electric tutor 100 and a keyboard musical instrument 200. The keyboard musical instrument 200 includes an acoustic upright piano, a silent system 300 and electronic tone generating system, and a keyboard and pedal mechanisms are essential parts of the acoustic upright piano serving as a kind of interface between a pianist and the keyboard musical instrument. In this instance, black/white keys 201 of the keyboard and a damper pedal 202 of one of the pedal mechanisms serve as manipulators. The electric tutor 100 shares a control unit 100A with the electronic tone generating system. The control unit 100A guides a trainee in a fingering on the keyboard and steps on the damper pedal, and controls the tone generation in response to the fingering and the steps.

Other electric/electronic components are also shared between the electric tutor and the electronic tone generating system. Such shared components are an electric power unit 210 and an interface unit 220. The electric power unit 210 distributes power voltages to the control unit 100A and other electric/electronic components. The electric power unit 210 generates a low dc voltage appropriate for a computer system and a high power voltage. The electric power unit 210 supplies the low dc voltage to the control unit 100A, and the high power voltage through the interface unit 220.

The interface 220 is provided between the control unit 100A and the other electric/electronic components such as an array of key driver units 230, an array of key sensors 240, an array of hammer sensors 250, a pedal driver unit 260 and pedal sensors 270. The array of key driver units 230 and the pedal driver units 260 are incorporated in the electric tutor, and the array of key sensors 240, the array of hammer sensors 250 and the pedal sensors 250 form parts of the electronic sound generating system. They are hereinlater detailed in conjunction with the electric tutor and the electronic sound generating system.

The interface 220 includes a controller 221 and power transistors 222/223 (see FIG. 3). Although a single transistor symbol is labeled with reference numeral 222, the eighty-eight power transistors 222 are incorporated in the interface 222, and are independently controlled by the controller 221. The controller 221 is integrated on a single semiconductor chip, and is connected to the control unit 100A. The power transistors 222 are respectively connected to the key driver units 230, and the power transistor 223 is connected to the pedal driver unit 260. The controller 221 selectively energizes the power transistors 222/223 so that the key driver units 230 and the pedal driver unit 260 actuates the black/white keys 201 and the damper pedal 202 under the control of the control unit 100A.

Acoustic Upright Piano

The acoustic upright piano is same as a standard upright piano, As shown in FIG. 3, the acoustic upright piano includes the keyboard, key action mechanisms 205 respectively linked with the black/white keys 201 of the keyboard, hammers 253 driven for rotation by the key action mechanisms, respectively, sets of strings 290 to be struck with the hammers 253, respectively, damper mechanisms 292 actuated by the black/white keys 201 for controlling the vibrations of the strings 290 and the pedal mechanisms 294. Eighty-eight black/white keys 201 form the keyboard, and are laid on the pattern of the keyboard of the standard upright piano. When a pianist depresses a black/white key 201, the associated key action mechanism 205 is activated, and causes the associated damper 292 to be spaced from the associated set of strings 290. The associated key action mechanism 205 drives the associated hammer 253 for rotation through an escape of a jack from the hammer 253, and the hammer 253 starts a free rotation at the escape. The hammer 253 strikes the associated set of strings 290, and causes it to vibrate for generating a tone. When the pianist releases the black/white key 201, the damper 292 is brought into contact with the set of strings 290, and damps the set of strings 290 down. If the pianist steps on the damper pedal 202, the pedal mechanism 294 keeps the damper 292 spaced from the associated set of strings 290, and prolongs the tone. Thus, the acoustic upright piano behaves as similar to the standard upright piano, and no further description is hereinbelow incorporated for the sake of simplicity.

Silent System

The silent system 300 includes a hammer stopper 301 and a link mechanism connected to the hammer stopper 301. The hammer stopper 301 is rotatably supported by action brackets (not shown) between the hammer shanks of the hammers 253 and the sets of strings 290. The pianist manipulates the link mechanism so as to change the hammer stopper 301 between a free position and a blocking position. The hammer stopper 301 at the blocking position is on the trajectories of the hammers 253, and the hammers 253 rebound on the hammer stopper 301 before striking the sets of strings 290. On the other hand, when the hammer stopper 301 is changed to the free position, the hammer stopper 301 is positioned out of the trajectories, and the hammers 253 strike the associated sets of strings 290 without any interference of the hammer stopper 301.

Control Unit

Figure 4:
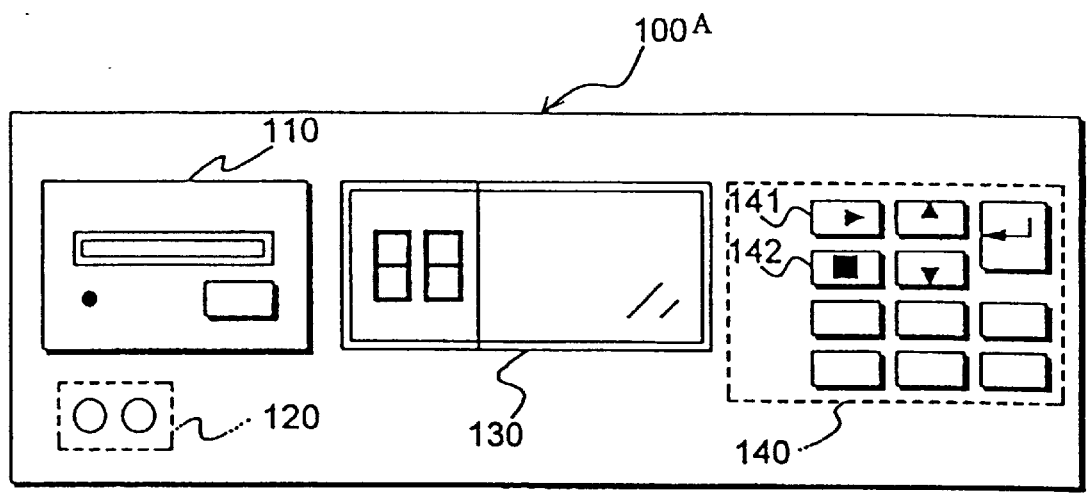
FIG. 4 is a front view showing the arrangement on a front board of a control unit incorporated in the electronic piano.

Turning to FIG. 4 of the drawings, the control unit 100A has a front board, and a floppy disk drive 110, a signal output port 120, a display unit 130 and a manipulating switch panel 140 are arranged on the front board. The floppy disk driver 110 has a slot. A floppy disk is inserted into the slot, and taken out therefrom. Though not shown in the drawings, the floppy disk driver has a magnetic head, and music data codes are written into and read out from the floppy disk through the magnetic head.

A speaker system SP and a headphone HH (see FIG. 5) arc connectable to the signal output port 120, and an audio signal is supplied through the Signal output port 120 to the speaker system SP and/or the headphone HH. Electronic sounds are produced through the speaker system SP and/or the headphone HH.

The display unit 130 is implemented by seven-segment light emitting diode arrays or a liquid crystal display. Characters and/or symbols are produced on the display unit 130, and the player is informed of the state of the electronic piano through the display unit 130.

The manipulating switch panel 140 has an array of manipulating switches. One 141 of the switches is used for a request for an electric guidance, and another switch 142 is used for cancellation of the request.

Figure 5:
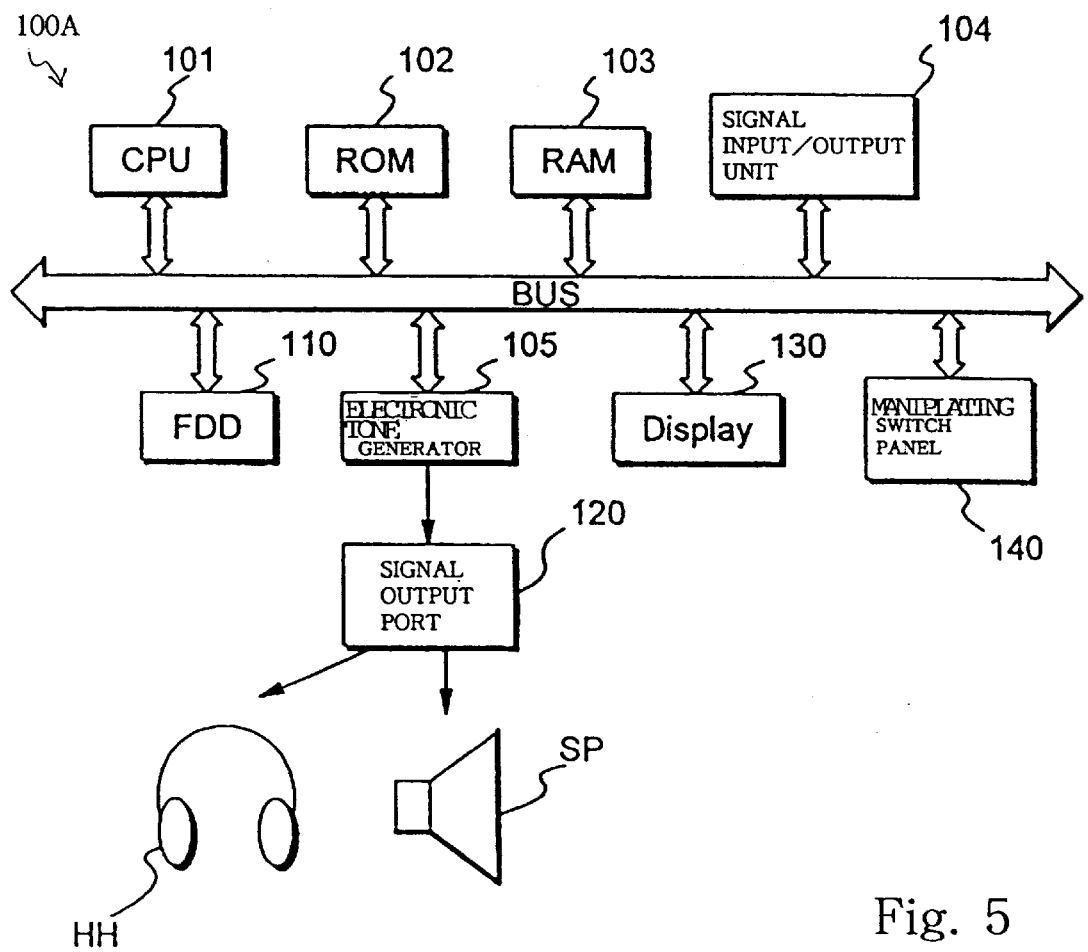
FIG. 5 is a block diagram showing the arrangement of an electronic data processing system of the control unit.

An electronic data processing system is incorporated in the control unit 100A, and FIG. 5 illustrates the arrangement of the electronic data processing system. The electronic data processing system includes a central processing unit 101, a read only memory 102, a random access memory 103, a signal input/output unit 104, the floppy disk driver 110, an electronic tone generator 105, the display unit 130 and the manipulating switch panel 140. The central processing unit 101, the read only memory 102 and the random access memory 103 are abbreviated as "CPU", "ROM" and "RAM", respectively.

The read only memory 102 serves as a program memory, and various computer programs are stored in the read only memory 102. The central processing unit 101 sequentially fetches instruction codes of a selected computer program, and executes them. In other words, the computer programs selectively run on the central processing unit 101. Several computer programs will be hereinlater described in detail.

The random access memory 103 serves as a working memory, flags and registers. The music data codes are transferred from the floppy disk to the random access memory 103, and arc processed by the central processing unit 101.

The signal input/output unit 104 is connected to the controller 221 of the interface unit 220, and detecting signals and driving signals are transferred from and to the interface unit 220. The audio signal is supplied from the electronic tone generator 105 through the signal output port 120 to the speaker system SP and/or the headphone HH.

Electronic Tone Generating System

The control unit 100A, the array of key sensors 240, the array of hammer sensors 250 and the pedal sensors 270 are incorporated in the electronic tone generating system. The key sensors 240 are respectively provided under the black/white keys 201, and monitor the associated black/white keys 201. If a black/white key 201 is depressed and, thereafter, released, the black/white key is moved toward the end position, and returns toward the rest position. The associated key sensor 240 detects the key motion, and varies a key position signal representative of a current position of the black/white key 201. In this instance, the key sensor 240 is the combination of a shutter plate 241, a light emitting element 242 and an optical fiber 243, and a photoelectric converter unit 281 is shared between the key sensors 240 and the hammer sensors 250. The shutter plate 241 is attached to the lower surface of the black/white key 201, and the light emitting element 242 is opposed to an incident end of the optical fiber 243 across the trajectory of the associated black/white key 201.

The hammer sensors 250 are respectively provided for the hammers 253, and monitor the associated hammers 253. When a black/white key 201 is depressed, the associated key action mechanism 205 drives the hammer 253 for rotation, and the hammer 253 strikes the set of strings 290. The associated hammer sensor 250 detects the impact against the set of strings 290, and produces a hammer detecting signal representative of the impact with the hammer 253. In this instance, the hammer sensor 250 is the combination of a shutter plate 251, a light emitting element 252 and an optical fiber 253. The shutter plate 251 is attached to the hammer shank of the hammer 253, and the light emitting element 252 is opposed to an incident end of the optical fiber 253 across the trajectory of the associated hammer 253.

The optical fibers 243 and 253 are connected to the photo-electric converting unit 281, and the photo-electric converter unit 281 produces the key position signals and hammer detecting signals. The photo-electric converting unit 281 supplies the key position signals and the hammer detecting signals to a sensor board 282. The sensor board 282 will be described hereinbelow.

The optical sensor disclosed in Japanese Patent Publication of Unexamined Application No. 9-54584 is available for the key sensors 240 and the hammer sensors 250. The optical sensor disclosed in the Japanese Patent Publication of Unexamined Application has a sensor box, and a slit is open to the shutter plate like the shatter plates 241/251. When the key/hammer is rotated, the shutter plate projects through the slit into the inner space of the sensor box. A light emitting sensor head is opposed to a light receiving sensor head across the trajectory of the shutter in the inner space. A light emitting diode is connected through an optical fiber to the light emitting sensor head, and the light receiving sensor head is connected through an optical fiber to a photo-detecting diode of the photo-electric converting unit. A light beam bridges the space between the light emitting sensor head and the light receiving sensor head. The light beam is of the order of 5 millimeters in diameter. The shutter plate gradually intercepts the light beam, and, accordingly, the amount of light on the light receiving sensor head is reduced. The photo-detecting diode generates photo-current proportional to the amount of light received, and the photo-electric converting unit produces an analog Signal varied with the current position of the shutter plate and, accordingly, the black/white key or the hammer.

Electric switches 271 serve as the pedal sensors 270, respectively. The electric switches 271 are respectively associated with the three pedal mechanisms 294. When the player steps on the pedals, the pedals pull down the associated pedal mechanisms 294, and the pedal mechanisms 294 close the associated electric switches 271. The electric switches 271 produce pedal detecting signals, and supply the pedal detecting signals to the sensor board 282.

The controller 100A receives digital data codes Sh representative of a performance on the acoustic upright piano from the sensor board 282. The controller 100A records the music data codes in a floppy disk, and/or transfers them to the outside thereof. The controller 100A further produces the audio signal from the music data codes, and supplies the audio signal to the speaker system SP and/or the headphone HH. In FIG. 3, the signal flow for the electronic tone generating system is indicated by white arrows.

Electric Tutor

The electric tutor includes the controller 100A, the array of the key drive units 230 and the pedal drive unit 260. Electromagnetic actuators 231 serve as the key drive units 230, respectively, and are provided under the rear end portions of the black/white keys 201, respectively. The electromagnetic actuator 231 has a solenoid unit and a plunger. The solenoid units of the electromagnetic actuators 231 are respectively connected in parallel between the electric power source 210 and the power transistors 222, and the high power voltage is supplied from the electric power source 210 through the interface 220 to the solenoid units. When the controller 221 makes a power transistor 222 turn on, the electric current flows through the solenoid unit of the associated electromagnetic actuator 231, and the solenoid unit creates magnetic field in around the solenoid unit. Then, the plunger upwardly projects from the solenoid unit, and pushes the rear end portion of the associated black/white key 201. The stroke of the plunger is short, and the electromagnetic actuator causes the front end portion of the associated black/white key 201 to slightly sink. The stroke is so short that the jacks of the key action mechanisms 205 do not escape from the associated hammers 253.

The pedal drive unit 260 is also implemented by an electromagnetic actuator 261. The electromagnetic actuator 261 has a solenoid unit and a plunger. The plunger forms a part of the pedal mechanism 294 for the damper pedal 201, and passes through the associated solenoid unit. The solenoid unit is connected between the electric power source 210 and the power transistor 223. When the controller 221 causes the power transistor 223 to turn on, the high power voltage is applied to the solenoid unit, and the electric current flows through the solenoid unit and the power transistor 223 to a discharge line. The solenoid unit creates the magnetic field, and the plunger is upwardly moved. The stroke is so short that the damper pedal is a little depressed. The damper pedal 202 does not space the damper mechanisms 292 from the associated sets of strings 290.

While a trainee is practicing on the acoustic upright piano 200, the control unit 100A instructs the controller 221 to selectively energize the solenoid units of the electromagnetic actuators 242/261. The electromagnetic actuators 242/261 slightly sink the black/white keys 201 and the damper pedal 202, and guide the trainee through previous notices and inductive actions. The previous notices are given to the fingers prior to timings to manipulate the black/white keys 201 and the damper pedal 202, and the inductive actions are given to the fingers and the foot at the timings to manipulate the black/white keys 201 and the damper pedal 202. The previous notices and the inductive actions are directly given to the fingers and the foot, and the trainee pays the attention to the fingers and the foot. The trainee can concentrate the eyes on the music score, and learns the piece of music through the music score and the guidance corresponding to the passage of the piece of music. In FIG. 3, the signal propagation and the motions of the component members are indicated by black arrows.

Thus, the electric tutor according to the present invention twice sinks a black/white key 201 to be depressed and the damper pedal 202. The black/white key 201 is a little sunk from the rest position before the timing to depress it for the previous notice, and returns to the rest position. When the timing comes, the black/white key 201 is sunk for the inductive action at the timing. Then, the trainee depresses the black/white key 201. The damper pedal 202 is also twice sunk for the previous notice and the inductive action. Thus, the electric tutor twice sinks the manipulators, i.e., the black/white keys 201 and the damper pedal 202 so as to guide a trainee in the practice on the piano.

Operations

Figure 6:
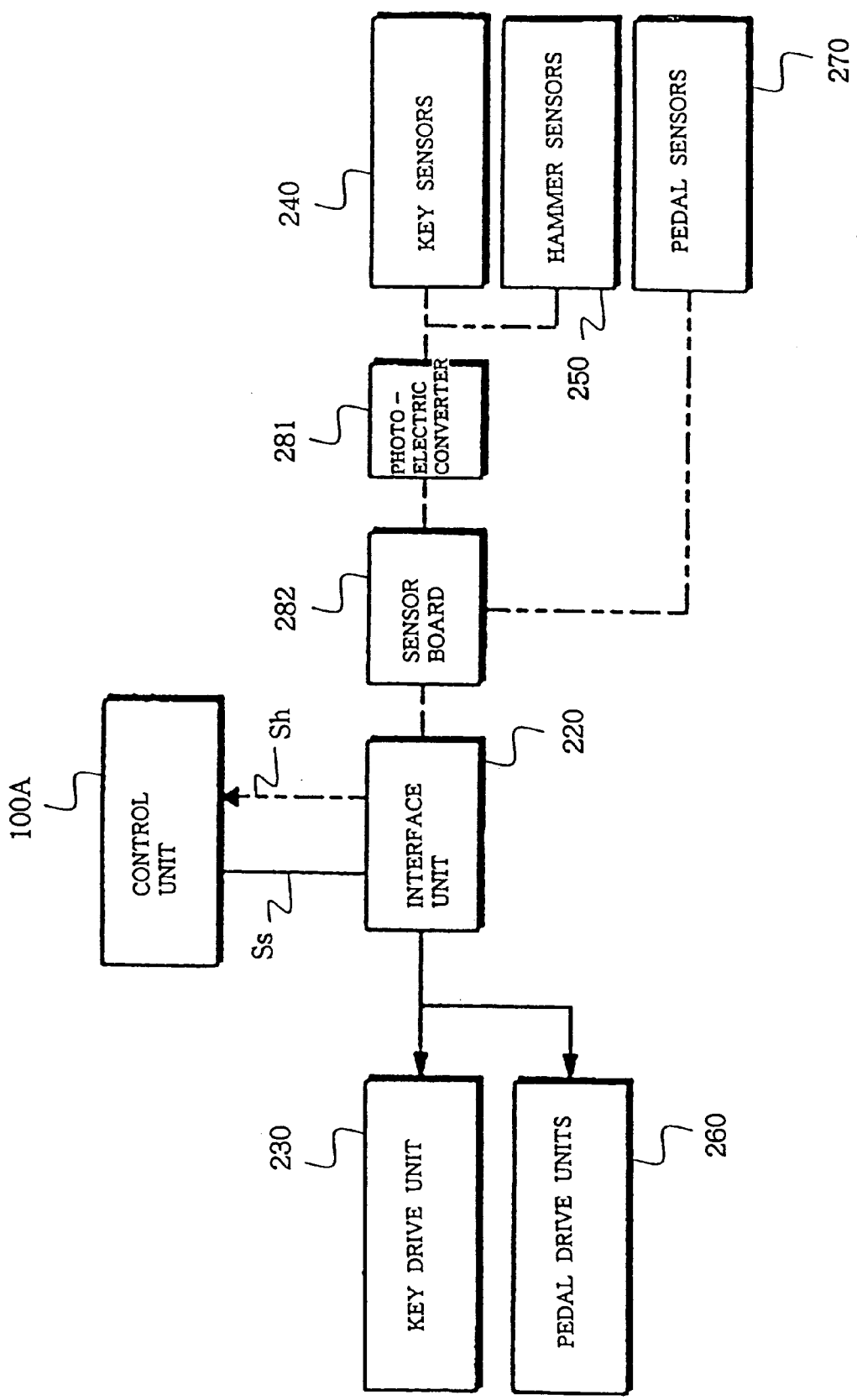
FIG. 6 is a block diagram showing signal flows in the electronic piano.

Description is hereinbelow made on operations of the electronic piano. FIG. 6 illustrates signal flows in the operation. Real lines are indicative of the signal flow for the electric tutor, and broken lines are indicative of the signal flow for the electronic tone generating system.

The electronic tone generating system behaves as follows. A player changes the hammer stopper 301 to the blocking position, and instructs the control unit 100A to produce electronic sounds. The key sensors 240, the hammer sensors 250 and the pedal sensors 270 start to respectively monitor the associated black/white keys 201, the hammers 253 and the pedal mechanisms 294.

The player is assumed to depress a black/white key 201. The shutter plate 241 gradually reduces the amount of light transferred through the optical fiber 243 to the photo-electric converting unit 281, and the photo-electric converting unit 281 decreases the magnitude of the key position signal representative of the current key position of the black/white key 201. The depressed black/white key 201 actuates the associated key action mechanism 205, and the key action mechanism 205 drives the associated hammer 253 for the free rotation. The sensor board 282 processes the key position signal, and determines a key velocity. The sensor board 282 produces pieces of music data information representative of a note number assigned to the depressed black/white key 201 and the key velocity.

The hammer 253 continues the free rotation toward the set of strings 290, and the hammer sensor 250 decreases the amount of light. Accordingly, the photo-electric converting unit 281 decreases the magnitude of the hammer detecting signal, and supplies the hammer detecting signal to the sensor board 282. The hammer 253 rebounds on the hammer stopper 301 immediately before the strike at the set of strings 290, and the sensor board 282 determines the time to be an impact timing. The sensor board 282 produces a piece of music data information representative of a key-on event.

The black/white key 201 returns toward the rest position, and the key sensor 240 increases the amount of light. The photo-electric converting unit 281 increases the magnitude of the key position signal, and supplies the key position signal to the sensor board 282. The sensor board 282 determines a timing at which the damper 292 is brought into contact with the set of strings 290. The sensor board 282 produces a piece of music data information representative of the timing.

If the player steps on the damper pedal 202, the pedal sensor 270 detects the motion of the damper pedal 202, and supplies the pedal detecting signal to the sensor board 282. The sensor board 282 produces a piece of music data information representative of the prolongation of the electronic tone.

When the player instructs the control unit 100A to generate electronic sounds, the sensor board 282 starts to increment a counter (not shown) for a piece of control data information representative of a lapse of time or a duration time. The sensor board 282 produces digital data codes Sh such as, for example, MIDI (Musical Instrument Digital Interface) codes from the pieces of music data information and the piece of control data information. The digital data codes Sh are transferred from the sensor board 282 to the control unit 100A. The control unit 100A may transfer the digital data codes Sh to the floppy disk driver 110 and/or an external system (not shown) through a communication line. The floppy disk driver 110 stores the digital data codes Sh in a suitable information storage medium such as a floppy disk. The control unit 100A further transfer the digital data codes to the electronic tone generator 105, and the electronic tone generator 105 generates the audio signal from the digital data codes. The audio signal is supplied through the signal output port 120 to the speaker system SP and/or the headphone HH, and the speaker system SP and/or the headphone HH generates the electronic tones corresponding to the acoustic tones not produced.

Figure 7:
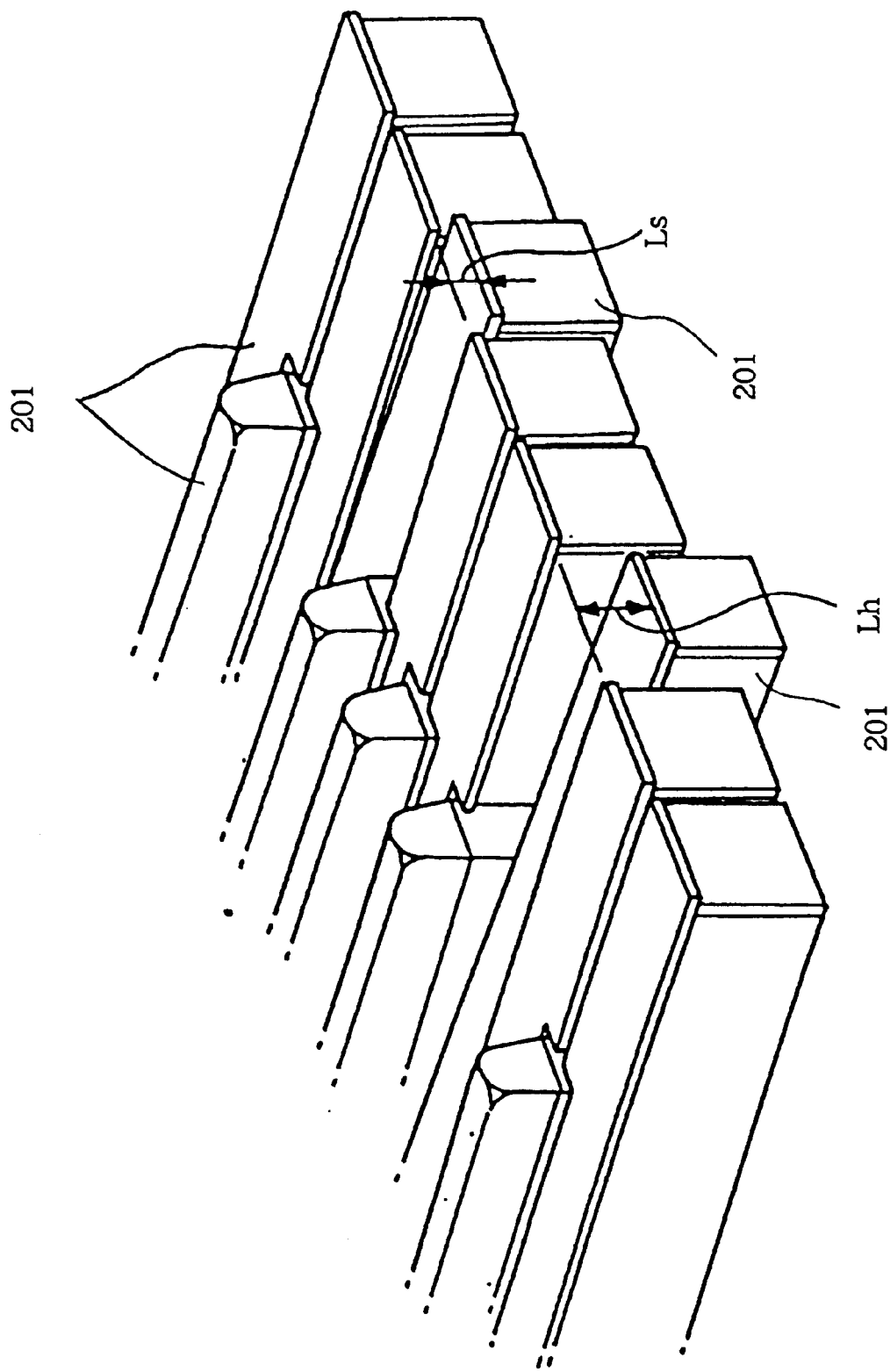
FIG. 7 is a perspective view showing a part of a keyboard incorporated in the electronic piano.

FIG. 7 shows a stroke Lh of the white key 201 depressed by a player in a performance and a stroke Ls of the white key 201 sunk by the key driver unit 230 for the previous notice or the inductive action. The strokes Lh/Ls are measured from the rest positions, and the stroke Lh is longer than the stroke Ls. When the key driver unit 230 moves the associated black/white key 201, the key position signal is decreased to a value corresponding to the stroke Ls. However, the key position signal does not exceed the value. The sensor board 282 checks the key position signal to see whether or not the stroke exceeds Ls. If the stroke does not exceed Ls, the sensor board 282 ignores the key motion, and does not supply the digital data code Sh through the interface unit 220 to the control unit 100A. On the other hand, if the stroke exceeds Ls, the sensor board 282 continues to monitor the key position signal and the hammer detecting signal, and supplies the digital data codes Sh through the interface unit 220 to the control unit 100A. There is a play between a black/white key of an acoustic piano and a key action mechanism, and the play takes up the key motion before the depressed key actuates the key action mechanism. The manufacturer may adjust the short stroke Ls to the stroke corresponding to the play.

The electric tutor behaves as follows. A standard performance is given in the form of a set of digital data codes, which is usually stored in a floppy disk. A trainee is assumed to request the electric tutor to guide him in the practice on the acoustic piano 220 by manipulating the switch 141. The electric tutor transfers the set of digital data code from the floppy disk to the random access memory 103.

FIG. 8 shows a part of the set of digital data codes stored in the random access memory 103. The digital data codes are formed in accordance with the MIDI standards. Most of the MIDI codes are broken down into two categories, i.e., the duration data and the event data. The event data represents one of the note-on and the note-off, the note number assigned to a depressed black/white key 201 and a velocity. The velocity is corresponding to the strength of force exerted on the depressed black/white key 201 and, accordingly, the strength of the impact.

The MIDI data codes are sequentially stored in the random access memory. The duration data code is representative of a relative time period between two events or the duration time. In this instance, a number of clock pulses is used as the duration time. The MIDI standards define that a quarter note is corresponding to twenty-four clock pulses of the MIDI timing clock signal. The time period for each quarter note is variable with a tempo so that the controller 100A determines the absolute time period between the events on the basis of the duration time and the tempo. If the tempo is 60, a minute is corresponding to sixty quarter notes, and each quarter note defines a second. Then, each MIDI timing clock is corresponding to a twenty-fourth second. The duration data stored in address "1" indicates that the duration time is 100 (see the first row of FIG. 8). The absolute time to the next event is approximately equal to 4 seconds, i.e., 100×(1/24)≈4. The control data representative of the tempo may be given by using a switch on the manipulating board 140. Otherwise, the control data representative of the tempo may be stored in the floppy disk. The control data may be stored at address "1", and the duration/event data codes may be stored from address "2" to address "n+1". In this instance, the previous notice is given to the trainee earlier than the inductive action by fifty clock pulses of the MIDI timing clock signal. Each event data code represents the kind of event, i.e., the note-on or the note-off, the note number and the velocity as shown in FIG. 8. The note number represents the pitch of a tone or a pitch name. The note number "60" is assigned to the pitch name "C" in the center scale on the keyboard of the acoustic piano 200. The note number is incremented from 0 to 127 at intervals of semitone. For this reason, when a note number is given to the control unit 100A, the control unit 100A selects a black/white key 201 to be depressed from the keyboard.

Thus, a set of digital data codes representative of a standard performance is stored in the random access memory 103, and a computer program runs on the central processing unit 101 so as to guide the trainee in the practice on the acoustic piano 200 as will be hereinlater described in detail.

Computer Programs

Computer programs for the electronic tone generating system and the electric tutor are stored in the read only memory 102, and the computer programs selectively run on the central processing unit 101 as follows.

Figure 9:
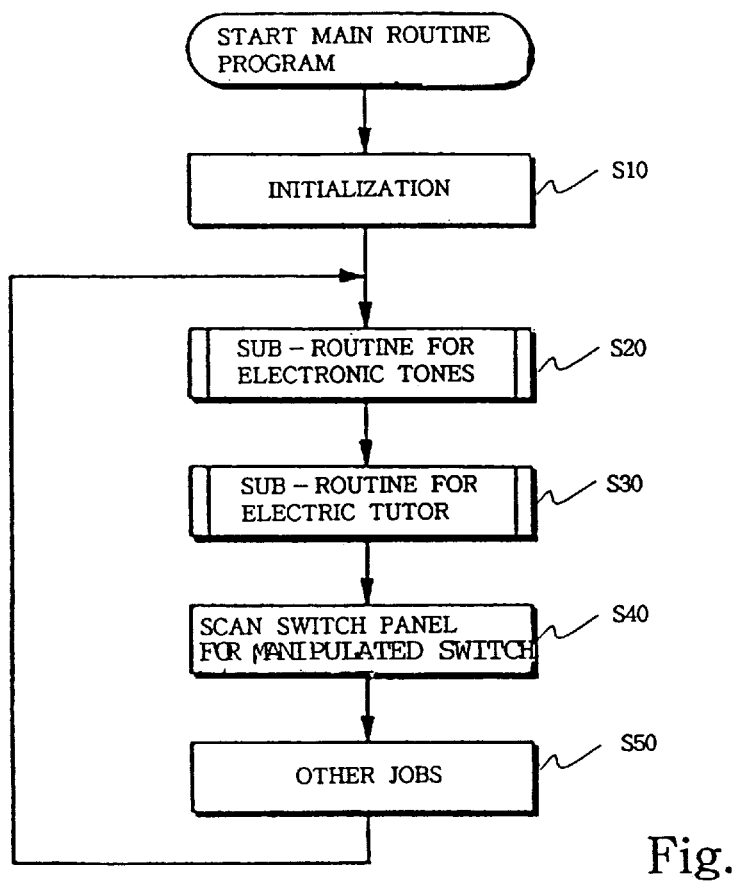
FIG. 9 is a flowchart showing a main routine program.

FIG. 9 shows a main routine program. When the control unit 100A is powered, the central processing unit 101 starts to sequentially execute programmed instructions of the main routine program. The central processing unit 101 firstly initializes the other units as by step S10. The registers and the flags in the random access memory 103 are cleared and/or default values are stored therein.

One of the flag BF is assigned to the request to the electric tutor. When the start switch 141 is manipulated, the flag BF is changed to "1" representative of the request for the guide. On the other hand, when the stop switch 142 is manipulated, the flag BF is changed to "0" representative of the cancellation of the request for the guide. Four registers D1, D2, AD1 and AD2 are used for the electric tutor (see FIG. 15). A time period until the next previous notice is stored in the register D1, and a time period until the next inductive action is stored in the register D2. The duration data are used for the time periods. The address stored in the register AD1 is indicative of the memory location where the MIDI to be read out for the previous notice is stored. On the other hand, the address stored in the register AD2 is indicative of the memory location where the MIDI data code to be read out for the inductive action is stored.

Figure 10:
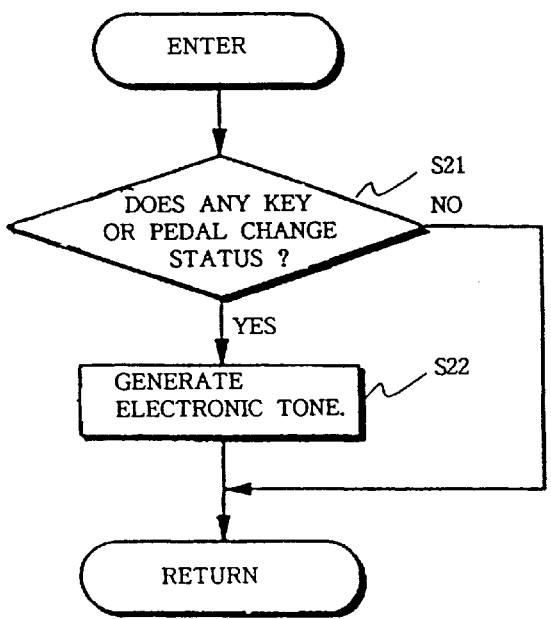
FIG. 10 is a flowchart showing a subroutine program for generating electronic sounds.
Figure 11:
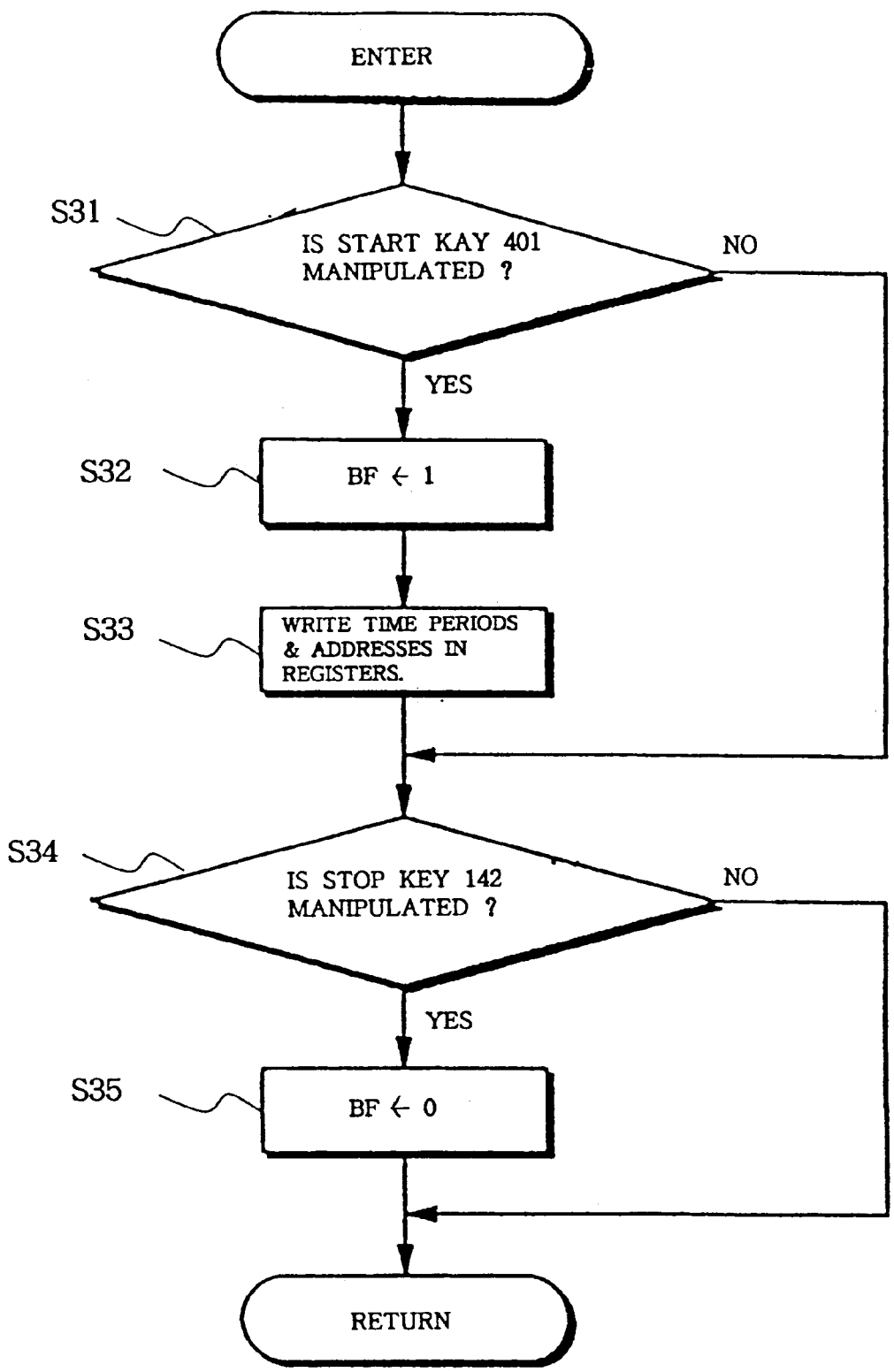
FIG. 11 is a flowchart showing a subroutine program for a request to guide a trainee in a practice on the acoustic piano.

Upon completion of the initialization, the central processing unit 101 proceeds to step S20, and is branched to a sub-routine for generating electronic tones. If the acoustic tones are selected, the central processing unit 101 skips step S20, and immediately returns to the main routine program. When the electronic tones are selected, the electronic tone generating system is activated, and electronic tones are generated on the basis of the pieces of music data information Sh. A sub-routine program for generating electronic tones is shown in FIG. 10, and is detailed hereinlater.

When the central processing unit 101 returns from the sub-routine program for generating electronic tones to the main routine program, the central processing unit 101 proceeds to step S30, and is branched to a sub-routine for the guide. Sub-routine programs for the guide are shown in FIGS. 11, 12, 13 and 14, and will be hereinlater described in detail.

Upon completion of the subroutine program or programs for the guide, the central processing unit 101 proceeds to step S40, and searches the manipulating switch panel 140 for a newly depressed switch. If a switch is newly depressed, the central processing unit 101 interprets the instruction given through the depressed switch, and changes the contents of the flag/register. If there is not any depressed switch or the above-described job is completed, the central processing unit 101 proceeds to step S50, and carries out other jobs. When the other jobs are completed, the central processing unit 101 returns to step S20. Thus, the central processing unit 101 reiterates the loop consisting of steps S20, S30, S40 and S50 until the electric power is removed from the control unit 100A.

The subroutine program for generating electronic tones is hereinbelow detailed with reference to FIG. 10. The central processing unit 101 firstly checks the signal input/output unit 104 to see whether or not the player depresses or releases any one of the black/white keys 201 or any one of the pedals as by step S21. If the answer at step S21 is given negative, the central processing unit 101 immediately returns to the main routine program. On the other hand, if the answer at step S21 is given affirmative, the central processing unit 101 produces a music data code from the pieces of music data information Sh related to the manipulated key 201 or the manipulated pedal as described in conjunction with the electronic tone generating system. The central processing unit 201 supplies the audio signal through the signal output port 120 to the speaker system SP and/or the headphone, and the electronic tone is generated as by step S22. Thereafter, the central processing unit 201 returns to the main routine program.

Figure 15:
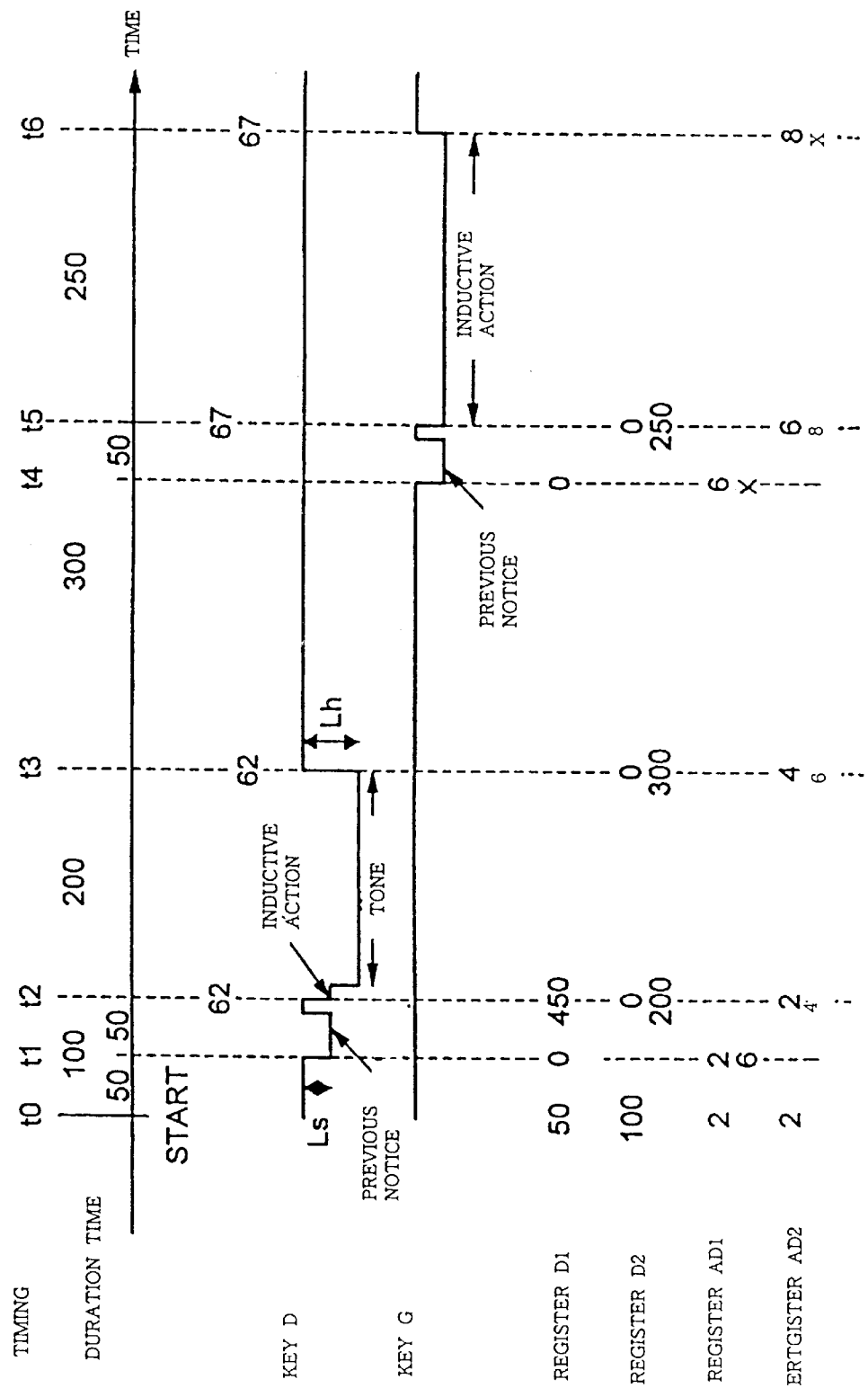
FIG. 15 is a timing chart showing the guide in the practice on the acoustic piano.

In the following description, a trainee is assumed to practice a piece of music represented by the MIDI data codes shown in FIG. 8, and the electric tutor guides the trainee in the practice on the acoustic piano as shown in FIG. 15. When the central processing unit 201 is branched to the subroutine for guiding the tutor in the practice on the acoustic piano, the central processing unit 201 checks the manipulating switch board. 140 to see whether or not the start switch 141 is manipulated as by step S31 (see FIG. 11). If the start switch 141 has been manipulated, the answer at step S31 is given affirmative, and the central processing unit 141 changes the flag BF to "1" as by step S32. The central processing unit 201 instructs the floppy disk driver 110 to transfer a set of MIDI data codes to the random access memory 103, and the MIDI data codes are stored as shown in FIG. 8. The central processing unit 201 proceeds to step S33, and writes the time periods and addresses in the registers D1/ D2/ AD1/ AD2 as by step S33. The first event data "note-on" is stored in address "2", and the duration time until the first note-on is "100". The central processing unit 201 subtracts 50 from 100, and writes the difference, i.e., 50 in the register D1 and the duration data of 100 in the register D2. The black/white key 201 assigned the note number 62 is to be sunk for the previous notice and the inductive action, and the note number 62 is stored at address "2". For this reason, the central processing unit 201 writes the address "2" in both registers AD1 and AD2. This is corresponding to timing t0 in FIG. 15. Then, the central processing unit 101 proceeds to step S34.

On the other hand, if the start switch 141 is not manipulated, the central processing unit 201 skips steps S32 and S33, and proceeds to step S34. The central processing unit 101 checks the manipulating switch board 140 to see whether or not the stop switch 142 is manipulated at step S34. If the stop switch 142 has been manipulated, the answer at step S34 is given affirmative, and the central processing unit 101 changes the flag BF to "0" as by step S35. Upon completion of step S35, the central processing unit returns to the main routine program. On the other hand, if the stop switch 142 has not been manipulated, the answer at step S34 is given negative, and the central processing unit 101 immediately returns to the main routine program without execution of step S35.

Figure 12:
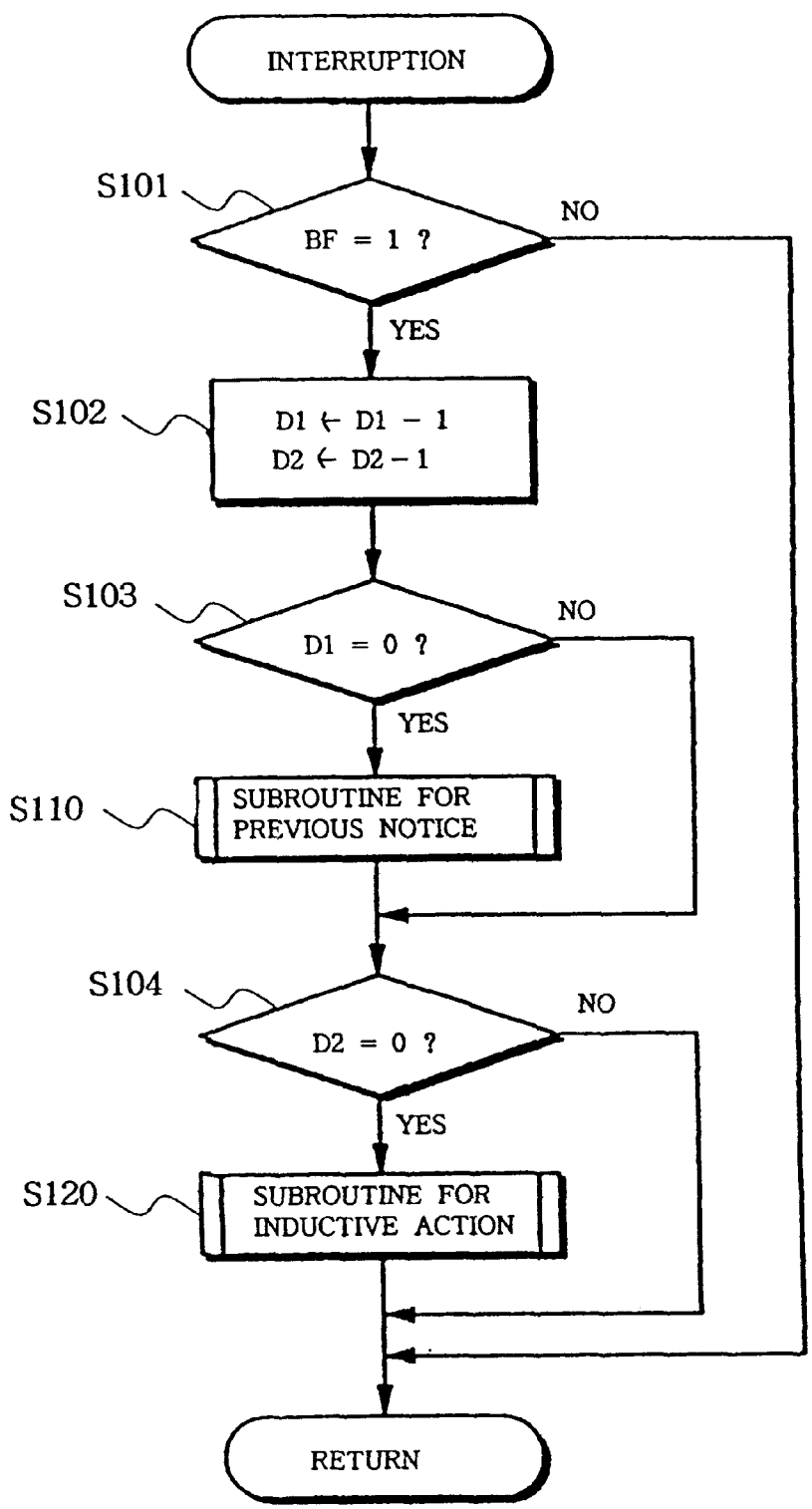
FIG. 12 is a flowchart showing a subroutine program for a timer interruption.

A timer interruption is repeated at intervals equivalent to a single pulse period of the MIDI timing clock signal, and a subroutine program shown in FIG. 12 runs on the central processing unit 101. The central processing unit 101 firstly checks the random access memory 103 to see whether the flag is "1" or not as by step S101. If the guide is not requested (see "NO" at step S31), the answer at step 101 is given negative, the central processing unit 101 immediately returns to the main routine program.

On the other hand, if the guide has been requested (see "YES" at step S31), the answer at step S101 is given affirmative, and the central processing unit 101 decrements the duration time stored in the register D1 and the duration time stored in the register D2 as by step S102.

Subsequently, the central processing unit 101 checks the register D1 to see whether or not the duration time reaches zero as by step S103. If the answer at step S103 is given negative, the central processing unit 101 checks the register D2 to see whether or not the duration time reaches zero as by step S104. If the answer at step S104 is given negative, the central processing unit 101 returns to the main routine program. Thus, the central processing unit 101 decrement the duration times stored in the registers D1/D2 at every clock pulse of the MIDI timing clock signal.

After repetition of the timer interruption, the duration time stored in the register D1 reaches zero at step S102, and the answer at step S103 is given affirmative. Then, the central processing unit 101 decides that the timing to give the previous notice comes, and is branched to a subroutine for a previous notice at step S110.

Figure 13:
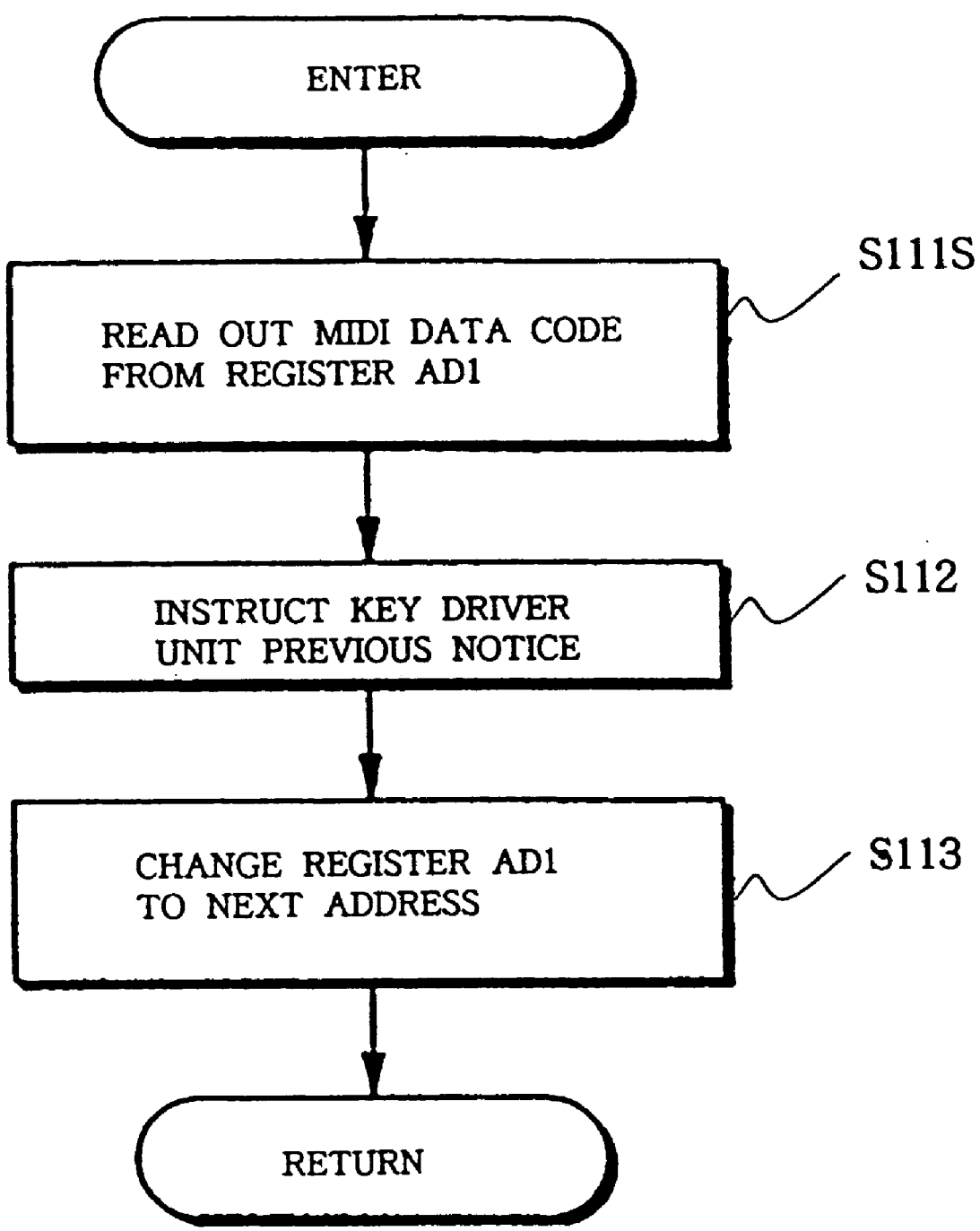
FIG. 13 is a flowchart showing a subroutine program for a previous notice.

A subroutine program for a previous notice is shown in FIG. 13. The central processing unit 101 reads out the address from the register AD1 as by step S111, and determines a black/white key 201 assigned the note number to be sunk for the previous notice. The address "2" is stored in the register AD1, and the MIDI data code is indicative of the note number "62". The note number "62" is indicative of the white key "D". Subsequently, the central processing unit 101 supplies a control signal Ss to the controller 221, and the controller 221 causes the power transistor 222 associated with the black/white key 201 to turn on. The key drive unit 230 under the black/white key 201 is energized, and pushes up the rear end portion of the black/white key 201. Then, the front end of the black/white key assigned the note number is sunk by Ls, and gives the previous notice to the trainee as by step S112.

Subsequently, the central processing unit 101 searches the random access memory 103 for the next note-on event. The next note-on event is instructed by the MIDI data code stored at the address "6". Then, the central processing unit 101 rewrites the register AD1 from address "2" to address "6" as by step S113. This is corresponding to timing t1 in FIG. 15. Thereafter, the central processing unit 101 returns to the subroutine program shown in FIG. 12.

Figure 14:
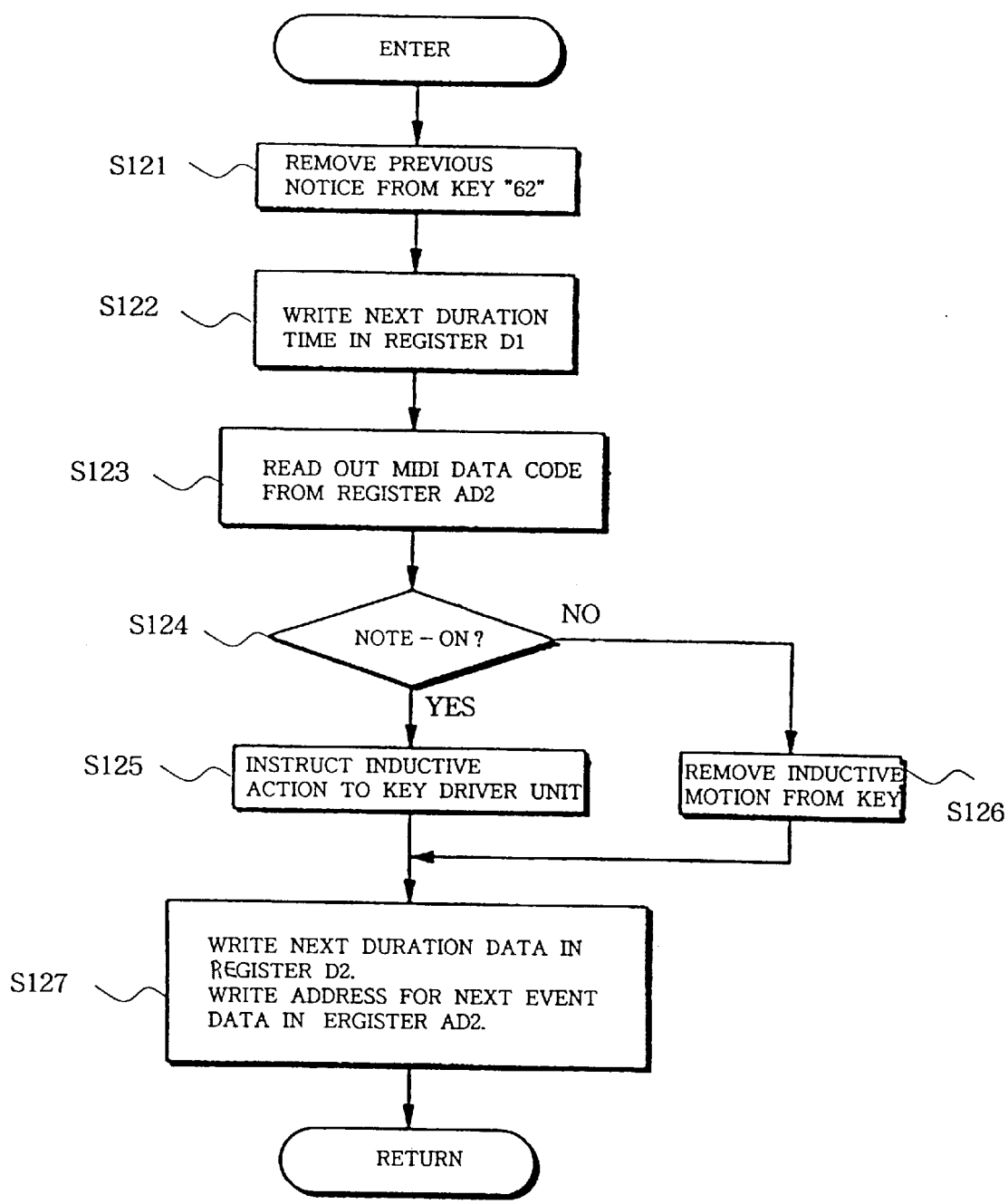
FIG. 14 is a flowchart showing a subroutine program for an inductive action.

The central processing unit 101 repeats the decrement of the duration time stored in the register D2, and the duration time finally reaches zero. Then, the answer at step S104 is given affirmative, and the central processing unit 101 is branched to a subroutine for the inductive action as by step S120. FIG. 14 shows a subroutine program for the inductive action. The central processing unit 101 firstly removes the previous notice from the white key D as by step S121. Subsequently, the central processing unit 101 determines a duration time until the next previous notice, and writes the duration time in the register D1 as by step S122. The next note-on event takes place at the white key assigned the note number 67 represented by the MIDI data code stored at address "6". The total duration time is 500, i.e., 200+300, and the central processing unit 101 subtracts 50 from 500. The duration time until the next previous notice is 450. Thus, the central processing unit 101 writes 450 in the register D1.

Subsequently, the central processing unit 101 reads out the MIDI data code from the register AD2 as by step S123, and checks the MIDI data code to see whether or not the note-on is requested as by step S124. The address "2" is stored in the register AD2, and the MIDI data code stored at the address "2" is indicative of the note-on. Then, the answer at step S124 is given affirmative, and the central processing unit 101 proceeds to step S125. The central processing unit 101 supplies the control signal Ss representative of the inductive action to the controller 221. The controller 221 causes the power transistor 222 associated with the white key D to turn on, and the electric power source 210 energizes the key driver unit 230 under the white key D. The white key D is sunk by the short stroke Ls, and gives the inductive action to the trainee.

Subsequently, the central processing unit 101 searches the random access memory 103 for the next duration time and the next event date. The next duration data is store at address "3", and is 200. The next event data is stored at address "4". Then, the central processing unit 101 writes the duration data of "200" and the next address "4" in the register D2 and the register AD2 as by step S127. Thereafter, the central processing unit 101 returns to the subroutine shown in FIG. 12. The trainee depresses the white key D, and the tone is generated.

When the duration time in the register D2 reaches zero, again, the answer at step S124 is given negative, because the event data stored at the address "4" is the note-off. The central processing unit 101 instructs the controller 221 to change the power transistor 222 to the off-state, and the key driver unit 230 retracts the plunger into the solenoid. Then, the inductive action is removed from the white key D as by step S126, and the white key D is allowed to return to the rest position.

Subsequently, the central processing unit 101 searches the random access memory 103 for the next duration time and the next event date. The next duration data is store at address "5", and is 300. The next event data is stored at address "6". Then, the central processing unit 101 writes the duration data of "300" and the next address "6" in the register D2 and the register AD2 as by step S127. This is corresponding to timing t3. Thereafter, the central processing unit 101 returns to the subroutine shown in FIG. 12.

Thus, the central processing unit 101 repeats the subroutine for the guide, and the electric tutor gives the previous notice and the inductive action to the trainee, and guides him in the practice on the acoustic piano 200. The next previous notice is given at timing t4, and the next inductive action is given at timing t5. Even if the trainee does not depress the white key G, the inductive action is removed from the white key G at timing t6. Although any MIDI data code for the damper pedal 202 is not incorporated in the part of the set of MIDI data codes shown in FIG. 8, the central processing unit 101 gives the previous notice and the inductive action to the trainee for the damper pedal 202.

As will be understood from the foregoing description, the electric tutor gives the previous notice to the trainee fifty clock pulses before the timing to depress a black/white key 201, removes the previous notice, and gives the inductive action to the trainee at the timing to depress the black/white key 201. The previous notice and the inductive action are given to the trainee as the short stroke Ls of the black/white key 201. The stroke Ls is too short to make the jack of the key action mechanism 205 escape from the hammer 253, and any acoustic/electronic tone is not generated. If the tempo is 60, the fifty clock pulses are equivalent to 50/24 second. The time interval between the previous notice and the inductive action is long enough to make the trainee ready for depressing the black/white key 201. The trainee follows the inductive action, and depresses the black/white key 201 for generating the acoustic/electronic tone. The trainee needs to pay the attention to the fingers without the music score, and the electric tutor effectively guides the practice on the acoustic piano 200.

In the first embodiment, the floppy disk and the random access memory 103 form in combination a memory. The central processing unit 101, the computer programs shown in FIGS. 11, 12, 13 and 14 and the registers D1/D2/AD1/AD2 as a whole constitute a data processor. The controller 220, the power transistors 222/223, the key driver units 230 and the pedal driver unit 260 as a whole constitute a driver. The black/white keys 201 and the damper pedal 202 serve as plural manipulators, and the key action mechanisms 205, the hammers 253, the sets of strings 290 and the electronic tone generating system as a whole constitute a tone generating means.

Second Embodiment

Another electronic piano embodying the present invention is similar in structure to the first embodiment, and only the software for the electric tutor is different. The electric tutor of the first embodiment gives the previous notice and the inductive action through the black/white key 201 to be depressed to the trainee. The electric tutor of the second embodiment further instructs a direction from a presently depressed black/white key 201 to the next black/white key 201. In order to instruct a finger from the presently depressed black/white key 201 to the next black/white key 201 to be depressed, the electric tutor successively sinks the black/white keys 201 therebetween by the short stroke Ls. In the following description, a set of MIDI data codes used in the training is assumed to be identical with that shown in FIG. 8.

Description is focused on registers not used in the first embodiment and, thereafter, computer programs different from those of the first embodiment. As described hereinbefore, the registers D1, D2, AD1 and AD2 are used for the electric tutor in the first embodiment. Registers D3 and H are further used for the electric tutor of the second embodiment. The register D3 is assigned to a piece of control data information representative of a time period until the instruction for movement, and the register H is assigned to another piece of control data information representative of the direction from the presently depressed black/white key 201 to the next black/white key 201 to be depressed. The note numbers assigned to the intermediate black/white key are sequentially stored in the register H for the instruction for movement.

Figure 16:
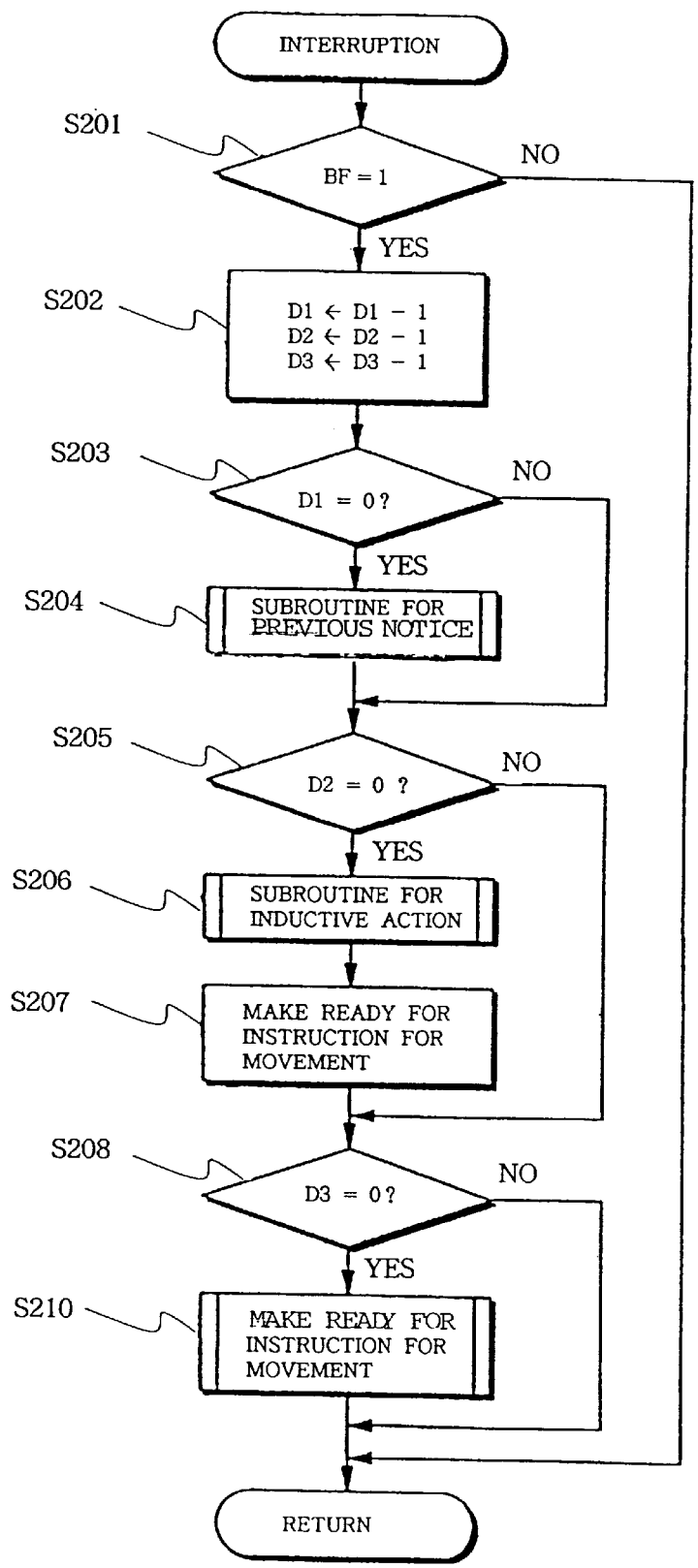
FIG. 16 is a flowchart showing another subroutine program for a timer interruption.
Figure 17:
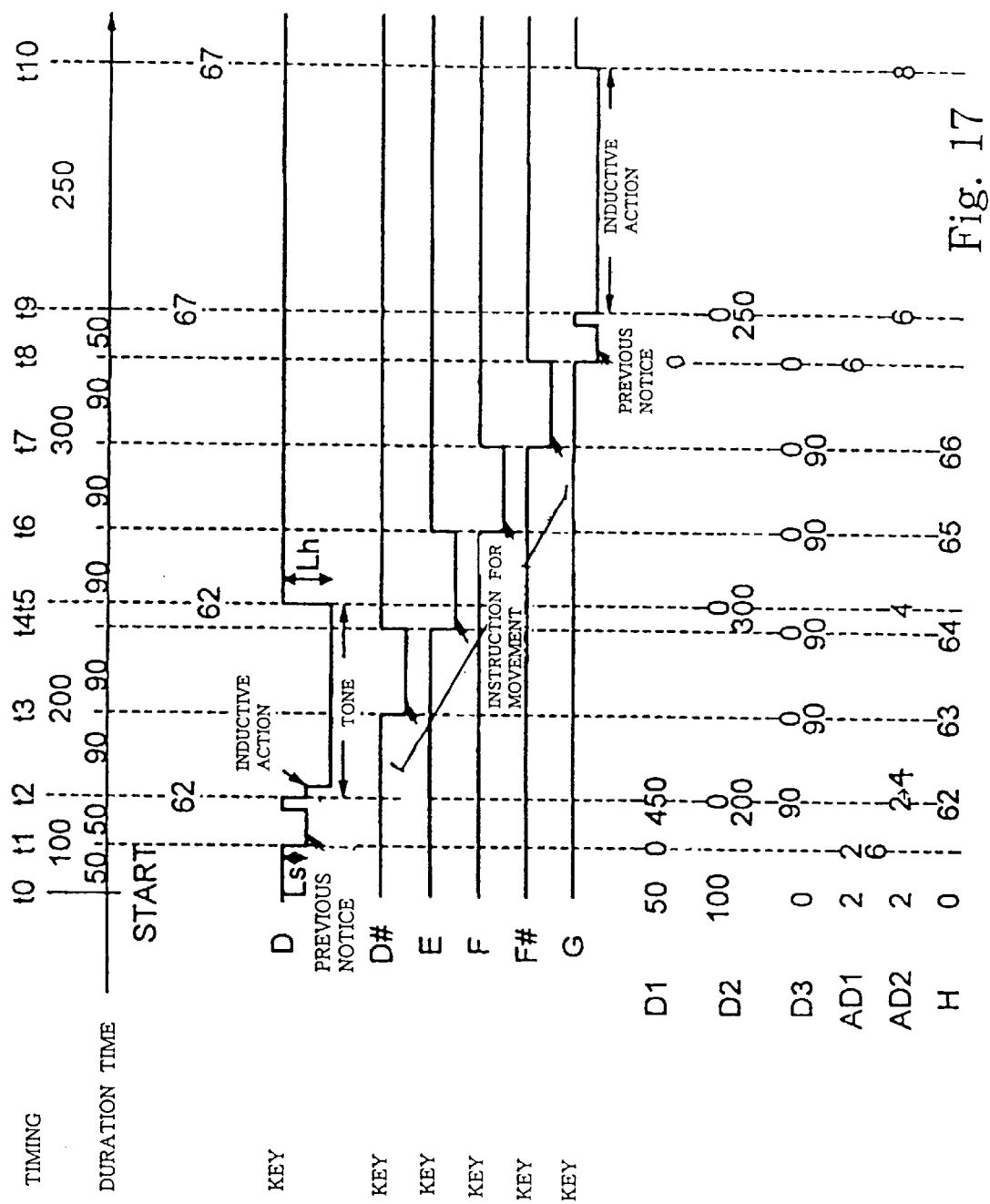
FIG. 17 is a timing chart showing another guide in the practice on the acoustic piano.

FIG. 16 illustrates a subroutine program executed at every timer interruption, and is corresponding to the subroutine shown in FIG. 12. The duration times "50", "100" and "0" and the addresses "2", "2" and zero have been stored in the registers D1/D2/D3 and AD1/AD2/ H, respectively, as shown in FIG. 17.

When the timer interruption takes place, the central processing unit 101 firstly checks the random access memory 103 to see whether or not the flag BF is "1" as by step S201. If the electric tutor has not been requested to guide the trainee, the answer at step S201 is given negative, and the central processing unit 101 immediately returns to the main routine program. On the other hand, if the electric tutor is requested to guide the trainee in the practice on the acoustic piano 200, the flag was changed to "1" (see S32 in FIG. 11), and the answer at step S201 is given affirmative. Then, the central processing unit 101 decrements the duration times stored in the registers D1/D2/D3 by one as by step S202. As described hereinbefore, the duration time stored in the register D1 is indicative of a time period until the previous notice, and the duration time stored in the register D2 is indicative of a time period until the inductive action. The duration time stored in the register D3 is indicative of a time period until the instruction for movement. The timer interruption takes place at the intervals of a pulse period of the MIDI timing pulse signal, and the duration times are decremented by one clock pulse during each timer interruption. When the duration times reach zero, the electric tutor starts to give the previous notice, the inductive action and the indication of direction to the trainee. In other words, the duration times stored in the registers D1/D2/D3 give the timings to start the previous notice, the inductive action and the instruction for movement to the electric tutor.

Subsequently, the central processing unit 101 sequentially checks the registers D1/D2/D3 to see whether or not any one of the duration times reaches zero as by step S203, S205 and S208. If all the answers are given negative, the central processing unit 101 returns to the main routine program. The central processing unit 101 repeats the subroutine program at intervals of the pulse period of the MIDI timing clock signal, and sequentially checks the registers D1/D2/D3 for the timings.

When the duration time stored in the register D1 reaches zero, the answer at step 203 is given affirmative, and the central processing unit 101 proceeds to a subroutine for the previous notice. This is corresponding to timing to in FIG. 17. The central processing unit 101 executes the subroutine program shown in FIG. 13. The central processing unit 101 determines the white key D assigned the note number 62 to be sunk for the previous notice on the basis of the MIDI data code stored in the address "2". The white key D is sunk by Ls for the previous notice, and the address stored in the register D1 is changed from "2" to "6".

The answer at step S205 is changed to affirmative at timing t2 (see FIG. 17), and the central processing unit 101 proceeds to the subroutine for the inductive action. The subroutine program shown in FIG. 14 runs on the central processing unit 101. The previous notice is removed from the white key D, and the duration time in the register DI is changed to "450". The inductive action is given to the white key D, and the central processing unit 101 changes the duration time in the register D2 and the address in the register AD2 from "0" to "200" and from "2" to "4".

Subsequently, the central processing unit 101 makes ready for the instruction for movement as by step S207. The central processing unit 101 calculates the time period until the instruction for movement, and stores a duration time corresponding to the time period in the register D3. The central processing unit 101 stores the note number assigned to the white key D in the register H.

The time period until the instruction for the movement is calculated as follows. As described hereinbefore, the previous notice is given fifty clock pulses before the timing to depress the next black/white key 201. In this instance, the next black/white key 201 to be depressed is the white key G, and the white key G is to be depressed at timing t9. The previous notice is to be given at timing t8. For this reason, the electric tutor has to sequentially sink the black/white keys D#, E, F and F# between timing t2 and timing t8. The electric tutor changes the intervals between the black/white keys to be sunk depending upon the number of the black/white keys 201 between the presently depressed black/white key 201 and the next black/white key 201 to be depressed. If there are many black/white keys 201, the electric tutor sequentially sinks the black/white keys 201 at short intervals. On the other hand, if there are only a few black/white keys 201, the electric tutor sequentially sinks the black/white keys 201 at long intervals. Thus, the electric tutor informs the trainee of the distance between the presently depressed black/white key 201 and the next black/white key 201 to be depressed by changing the intervals.

The central processing unit 101 firstly calculates a time period Ta from the timing to presently depress the black/white key 201 to the timing for the next previous notice. Subsequently, the central processing unit 101 determines the number N of black/white keys 201 on the basis of the note number assigned to the presently depressed black/white key 201 and the note number assigned to the next black/white key 201 to be depressed. The time intervals Tb are calculated as $$Tb=Ta/N$$

The presently depressed black/white key 201 is the white key D, and the next black/white key 201 to be depressed is the white key G. The total duration time is 500, i.e., 200+300 (see addresses "2" and "5"). The previous notice is fifty clock pulses before the inductive action for the white key G, and the time period Ta is 450. The note number assigned to the white key D is 62, and the note number assigned to the white key G is 67, Then, the number N of black/white keys 201 is 5, i.e., 67–62. The time intervals Tb is calculated at 90. For this reason, the duration time "90" is stored in the register D3 (see timing t2 in FIG. 17).

Figure 18:
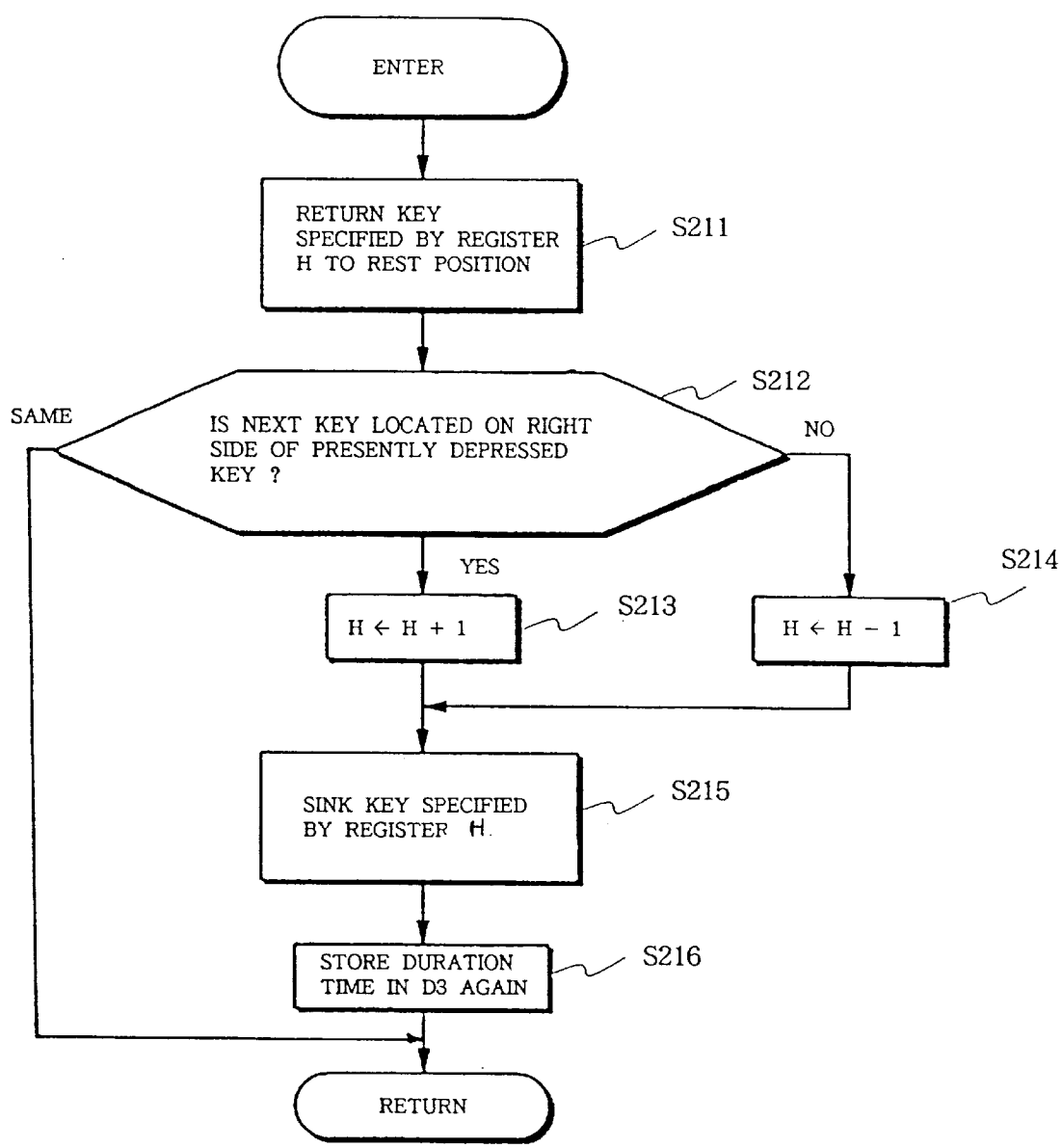
FIG. 18 is a flowchart showing a subroutine program for an indication of direction.

The central processing unit repeats the subroutine program, and waits for a change of answer at step S208. The duration time stored in the register D3 reaches zero at timing t3, and the answer at step S208 is changed to affirmative. Then, the central processing unit 101 proceeds to step S210, and executes a subroutine for the instruction for movement. FIG. 18 shows a subroutine program for the instruction for movement. The central processing unit 101 firstly causes the black/white key 201 assigned the note number stored in the register H to return to the rest position as by step 211.

Subsequently, the central processing unit 201 compare the MIDI data code stored at the address stored in the register AD2 and the note number stored in the register H to see whether or not the next black/white key 201 to be depressed is located on the right side of the presently depressed/sunk black/white key 201 as by step S212. If the answer at step S212 is given affirmative, the central processing unit 201 increments the note number by one as by step S213. On the other hand, if the answer at step S212 is given negative, the central processing unit 201 decrements the note number by one as by step S214. However, if the next black/white key 201 is same as the presently depressed black/white key 201, the central processing unit 101 immediately returns to the subroutine program, because any instruction for movement is not required. In this instance, the presently depressed black/white key 201 is the white key D assigned the note number "62", and the next black/white key 201 to be depressed is the white key G assigned the note number "67". Then, the central processing unit 201 increments the note number stored in the register H. As a result, the note number "63" is stored in the register H (see timing t3).

Subsequently, the central processing unit 201 supplies the control signal Ss to the controller 211 so as to energize the power transistor 222 associated with the black/white key 201 assigned the note number stored in the register H. Then, the key drive unit 230 sinks the adjacent black/white key 201 by the short stroke Ls as by step S215.

Subsequently, the central processing unit 101 stores the duration time or the time interval "90" in the register D3, again, as by step S216, and returns to the subroutine program shown in FIG. 16.

The central processing unit 101 repeats the timer interruption, and decrements the duration time stored in the register D3. The duration time stored in the register D3 reaches zero at timing t4, again. Then, the central processing unit 201 instructs the driver 221 to remove the potential from the key driver unit 230 under the key D# and to actuate the key driver unit 230 under the key E. The key D# returns to the rest position, and the key driver unit 230 sinks the key E by the stroke Ls. The central processing unit 101 rewrites the note number stored in the register H and the duration time stored in the register D3 to "64" and "90", respectively.

Similarly, the black/white keys F and F# are sunk at timing t6 and timing t7, respectively, at the intervals of "90". The black/white keys D#, E, F and F# are sequentially sunk by the short stroke Ls, and the electric tutor instructs the trainee that the next white key G to be depressed is on the right side of the presently depressed white key D. The electric tutor gives the previous notice to the trainee at time t8, and the inductive action to the trainee at time t9 for the white key G.

As will be understood from the foregoing description, the electric tutor implementing the second embodiment gives a trainee the instruction of movement as well as the previous notice and the inductive action. The trainee is previously noticed which direction he has to move the hand. Moreover, the time intervals to sequentially sink the black/white keys are varied depending upon the interval between the presently depressed key and the next key. The trainee is further noticed how fast he has to move the hand. Thus, the electric tutor according to the present invention guides the trainee in the practice on the acoustic piano.

Although particular embodiments of the present invention have been shown and described, it will be obvious to those skilled in the art that various changes and modifications may be made without departing from the spirit and scope of the present invention.

For example, the acoustic piano may be a standard grand piano. The hammer stopper may be changed between the free position and the blocking position by an electric motor, and the control unit 100A may instruct a driver to energize the electric motor.

The electric tutor may be provided for another kind of keyboard musical instrument such as, for example, an electronic keyboard, an acoustic upright piano, an acoustic grand piano, an organ and a harpsichord and another kind of musical instrument such as, for example, a wind instrument and a stringed instrument as long as the musical instrument has plural manipulators used for a performance.

The electric tutor may give the previous notice and the induced action to a trainee for other pedals, i.e., the soft pedal and a sostenute pedal.

The set of digital data codes may be transferred from another kind of information storage medium such as a CD-ROM, an opto-magnetic disk. Sets of digital data codes may be built in a hard disk. A set of digital data codes may be supplied from an external source through a communication line to the random access memory 103. A set of digital data codes may represent an actual performance on the acoustic piano 200. In this instance, the central processing unit 101 instructs the floppy disk driver 110 to store it in a floppy disk or another kind of information storage medium.

The digital data codes may be formed on the basis of another kind of standards. The lapse of time to an event may be stored in the form of absolute time or in the form of note.

Acoustic tones may be produced in the practice guided by the electric tutor. An electric tutor may slightly lift black/white keys to be depressed. If the electronic tones are generated in the practice guided by the electric tutor, the stroke Ls may be equal to the stroke Lh. In this instance, the key motions for the previous notice and the inductive action are ignored, and no electronic tone is generated. Otherwise, the sets of strings are blocked from the hammers.

In the above-described embodiments, term "initial position" is corresponding to the rest position of the black/white key 201, However, if a grand piano is used as the acoustic piano 200, the initial position may be corresponding to a home position of a jack not actuated by the associated black/white key, because the trainee can depress the black/white key in so far as the jack button and the jack stop spoon are in contact.

The electric tutor may keep the black/white keys between the presently depressed key and the next key in the depressed state until the previous notice for the next key. The time interval may be shortened toward the next key. The interval between the previous notice and the inductive action are not limited to 50 clock pulses, and the timing clock. The interval may be given as an absolute time period. The timing clock is not limited to the MIDI timing clock signal.

One of the previous notice and the inductive action may be given through an array of light emitting diodes provided on or in proximity to the black/white keys to be depressed. In this instance, the controller 221 selectively energizes the light emitting diodes as well as the key drive units 230 for the inductive action. The light emitting diodes between the presently depressed key and the next key to be depressed may be sequentially energized for radiating light beams for the instruction for movement. The array of light emitting diodes may be provided on the black/white keys or in the proximity to the black/white keys. The light emitting diodes may be replaced with other light-emitting elements or a liquid crystal display. The light emitting elements may be changed between on-state and off-state or between a color and (red) a different color (green). The light-emitting elements or the liquid crystal display serve as indicators.

The computer programs may be transferred from a non-volatile memory card, a CD-ROM, a floppy disk, an opto-magnetic disk or a magnetic disk to the random access memory 103. Such a portable information storage medium is convenient at a version-up.

What is claimed is:

1. An electric tutor associated with a musical instrument having plural manipulators for guiding a trainee in a practice on said plural manipulators, comprising:

a memory for storing pieces of music data information representative of a performance;

a data processor selectively fetching said pieces of music data information, and generating a piece of control data information representative of one of said plural manipulators to be manipulated in said practice and another piece of control data information representative of a timing to manipulate said one of said plural manipulators; and a driver including plural driving units respectively associated with said plural manipulators and responsive to said piece of control data information and said another piece of control data information so as to manipulate said one of said plural manipulators at said timing to the extent not to generate a sound.

2. The electric tutor as set forth in claim 1, in which said another piece of control data information contains a first sub-piece of control data information representative of a first sub-timing given to said driver for a previous notice to said trainee, a second sub-piece of control data information representative of a second sub-timing given after said first sub-timing for removing said previous notice from said one of said plural manipulators and a third sub-piece of control data information representative of a third sub-timing given after said second sub-timing for an inductive action to said trainee, and said driver is responsive to said first sub-piece, said second sub-piece and said third sub-piece of control data information so as to move said one of said plural manipulators from an initial position to the extent not to generate said sound at said first sub-timing, recover said one of said plural manipulators to said initial position at said second sub-timing and move said one of said plural manipulators from said initial position to the extent not to generate said sound at said third sub-timing.

3. The electric tutor as set forth in claim 2, in which said another piece of control data information further contains a fourth sub-piece of control data information representative of manipulators selected from said plural manipulators and located between said one of said plural manipulators and another of said plural manipulators to be manipulated after said third sub-timing and time intervals for sequentially manipulating said manipulators between said third sub-timing and another timing to manipulate said another of said plural manipulators for said previous notice.

4. The electric tutor as set forth in claim 3, in which said time intervals are varied depending upon the number of said manipulators.

5. The electric tutor as set forth in claim 1, in which said timing is before another timing to manipulate said one of said plural manipulators for generating said sound, and said electric tutor further comprises plural indicators respectively associated with said plural manipulators, said driver changing one of said plural actuators associated with said one of said plural manipulator to an active state at said another timing.

6. The electric tutor as set forth in claim 5, in which said driver sequentially activates the indicators between said one of said plural manipulators and another of said plural manipulators to be manipulated for generating another sound to the extent not to generate a sound after said another timing.

7. A musical instrument comprising plural manipulators used for specifying an attribute of tones, a tone generating means responsive to said plural manipulators for generating said tones, and an electric tutor including a memory for storing pieces of music data information representative of a performance, a data processor selectively fetching said pieces of music data information, and generating a piece of control data information representative of one of said plural manipulators to be manipulated in said practice and another piece of control data information representative of a timing to manipulate said one of said plural manipulators and a driver including plural driving units respectively associated with said plural manipulators and responsive to said piece of control data information and said another piece of control data information so as to manipulate said one of said plural manipulators at said timing to the extent not to generate the tone.

8. The musical instrument as set forth in claim 7, in which said manipulators and said tone generating means form parts of an acoustic piano.

9. The musical instrument as set forth in claim 8, in which said manipulators are selected from the group consisting of black and white keys and pedals.

10. The musical instrument as set forth in claim 8, in which said manipulators are selected from the group consisting of black and white keys and pedals, and said tone generating means includes:

key action mechanisms respectively connected to said black and white keys and selectively actuated by the associated black and white keys moved from rest positions toward end positions;

hammers respectively associated with said key action mechanisms and selectively driven for free rotation by the associated key action mechanisms moved from said rest positions toward said end positions; and string means associated with said hammers and selectively struck by the associated hammers driven for free rotation.

11. The musical instrument as set forth in claim 10, further comprising an electronic tone generating system responsive to an fingering on said black and white keys for generating electronic tones.

12. The musical instrument as set forth in claim 11, further comprising a silent system having a stopper changed between a free position and a blocking position, said stopper in said free position allowing said hammers to strike the associated string means, said stopper in said blocking position rebounding said hammers after escapes of jacks and impacts against said string means.

13. The musical instrument as set forth in claim 7, in which said manipulators and said tone generating means form parts of an electrically tone generating keyboard musical instrument.

14. A method for guiding a trainee in a practice on plural manipulators incorporated in a musical instrument, comprising the steps of:

a) determining one of said plural manipulators to be manipulated and a timing to manipulate said one of said plural manipulators; based on music data information stored in a memory b) waiting for said timing; and c) manipulating said one of said plural manipulators at said timing through control of a driver that is responsive to control data to the extent not to generate a tone.

15. The method as set forth in claim 14, in which said step c) includes the sub-steps of c-1) manipulating said one of said plural manipulators at a first sub-timing to the extent not to generate said tone for a previous notice, c-2) waiting for a second sub-timing at which said trainee is expected to manipulate said one of said plural manipulators, and c-3) manipulating said one of said plural manipulators at said second sub-timing.

16. The method as set forth in claim 15, in which said step c) further includes the sub-steps of c-3) determining manipulators selected from said plural manipulators and located between said one of said plural manipulators and another of said plural manipulators to be manipulated after said second sub-timing by said trainee, and c-4) sequentially manipulating said manipulators between said second sub-timing and another timing to give said trainee said previous notice for said another of said plural manipulators.

17. An information storage medium for storing a program representative of a method for guiding a trainee in a practice on plural manipulator incorporated in a musical instrument, said method comprising the steps of:

a) determining one of said plural manipulators to be manipulated and a timing to manipulate said one of said plural manipulators; based on music data information stored in a memory b) waiting for said timing; and c) manipulating said one of said plural manipulators at said timing through control of a driver that is responsive to control data to the extent not to generate a tone.

18. The information storage medium as set forth in claim 17, in which said step c) includes the sub-steps of c-1) manipulating said one of said plural manipulators at a first sub-timing to the extent not to generate said tone for a previous notice, c-2) waiting for a second sub-timing at which said trainee is expected to manipulate said one of said plural manipulators, and c-3) manipulating said one of said plural manipulators at said second sub-timing.

19. The information storage medium as set forth in claim 18, in which said step c) further includes the sub-stops of c-3) determining manipulators selected from said plural manipulators and located between said one of said plural manipulators and another of said plural manipulators to be manipulated after said second sub-timing by said trainee, and c-4) sequentially manipulating said manipulators between said second sub-timing and another timing to give said trainee said previous notice for said another of said plural manipulators.

* * * * *